(12) United States Patent
Kanamoto et al.

(10) Patent No.: US 7,324,692 B2
(45) Date of Patent: Jan. 29, 2008

(54) CHARACTER RECOGNITION METHOD

(75) Inventors: Kouichi Kanamoto, Inagi (JP); Yutaka Katsumata, Inagi (JP); Shinichi Eguchi, Inagi (JP)

(73) Assignees: Fujitsu Limited, Kawasaki (JP); Fujitsu Frontech Limited, Tokyo (JP)

(*) Notice: Subject to any disclaimer, the term of this patent is extended or adjusted under 35 U.S.C. 154(b) by 727 days.

(21) Appl. No.: 10/912,234

(22) Filed: Aug. 6, 2004

(65) Prior Publication Data
US 2005/0201620 A1 Sep. 15, 2005

(30) Foreign Application Priority Data
Mar. 10, 2004 (JP) .............................. 2004-067728

(51) Int. Cl.
*G06K 9/20* (2006.01)
(52) U.S. Cl. ...................... 382/182; 382/164; 382/171; 382/176
(58) Field of Classification Search ................ 382/164, 382/171, 176, 182
See application file for complete search history.

(56) References Cited

U.S. PATENT DOCUMENTS

| 5,335,292 A | 8/1994 | Lovelady et al. ............. 382/17 |
| 5,459,797 A * | 10/1995 | Sato ............................ 382/165 |
| 6,501,864 B1 | 12/2002 | Eguchi et al. .............. 382/306 |
| 2002/0172422 A1 | 11/2002 | Nishiwaki ................... 382/177 |

FOREIGN PATENT DOCUMENTS

| EP | 0618545 | 10/1994 |
| JP | HEI 2-204879 | 8/1990 |
| JP | 2000-57260 | 2/2000 |
| JP | 2000-322510 | 11/2000 |
| JP | 2001-92912 | 4/2001 |
| JP | 2001-297303 | 10/2001 |
| JP | 2003-196591 | 7/2003 |
| JP | 2003-196592 | 7/2003 |

OTHER PUBLICATIONS

European Patent Office Search Report dated Aug. 3, 2006 for corresponding European Patent Application No. 04019715.4.

\* cited by examiner

*Primary Examiner*—Samir Ahmed
*Assistant Examiner*—John W Lee
(74) *Attorney, Agent, or Firm*—Staas & Halsey LLP

(57) ABSTRACT

The present invention is a character recognition apparatus, which comprises a background discriminating section, a non-character line discriminating section, a first non-character line removed image creating section that creates a first non-character line removed image, which is an original image from which the non-character line is removed, a first character area discriminating section, an enlarged image creating section, a second non-character line removed image creating section, an interference judgment section that judges whether or not the character and the non-character line interfere with each other in the original image, a character image restoring section that restores the character image, a second character area discriminating section, and a character recognizing section that digitizes the character area recognized by the second character area discriminating section and recognizes the character, thereby characters written on a color form are recognized at a high accuracy.

18 Claims, 15 Drawing Sheets

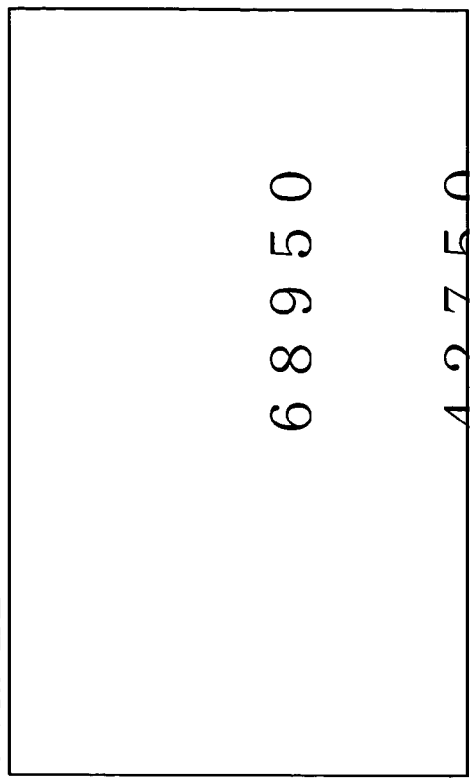
FIG. 2A
FIG. 2B
FIG. 2C
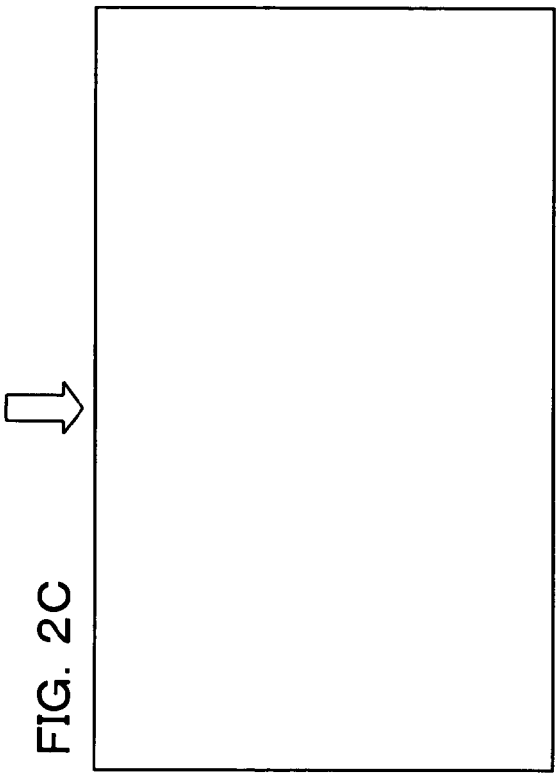
FIG. 2D $$f1: S = \frac{1}{4000}(255 - LUM)^2 + 10$$

$$f2: \frac{S}{2} = \frac{1}{2} \times \frac{1}{4000}(255 - LUM)^2 + 10$$

HORIZONTAL
HISTOGRAM  1234

VERTICAL HISTOGRAM

LINE

RULED LINE INFORMATION

FIG. 12
FIG. 13
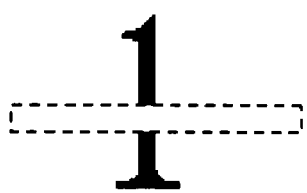
FIG. 14
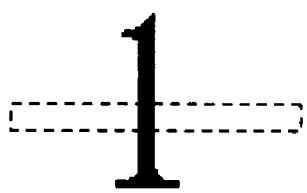
FIG. 15A          FIG. 15B
  
SPLINE CURVE                    SPLINE CURVE

CHARACTER RECOGNITION METHOD

BACKGROUND OF THE INVENTION (1) Field of the Invention

The present invention relates to a technique suitably used for, for example, processing forms in banking facilities; and more particularly, to a technique for recognizing characters written in color forms.

(2) Description of Related Art

In banking facilities and so on, as an apparatus for reading character information written in forms as image data and then recognizing the data as characters, image reading apparatus such as optical character recognition apparatus (OCR) is used. By employing OCR apparatus, the efficiency of the transaction of business has been improved.

In conventional OCR technique, image data on a form is obtained as a monochrome binary image, and then, recognized as characters. For example, with respect to a form, on which ruled-lines, guide characters and the like are printed with predetermined dropout colors such as green color, red color and the like, characters, which are written with colors (black color etc.) other than the dropout colors in character recognition target areas (spaces for filling with characters), are read out as monochrome binary image by an OCR apparatus; and based on the binary image, character recognition processing is carried out (refer to the following patent documents 1-3).

[Patent document 1] Japanese Patent Laid-Open No. 2000-322510

[Patent document 2] Japanese Patent Laid-Open No. 2001-297303

[Patent document 3] Japanese Patent Laid-Open No. 2003-196592

In order to increase the legibility of information written on forms and to highlight characters written thereon, color forms, on which ruled-lines, background, guide characters and the like are printed using various colors, are occasionally used.

In the conventional OCR technique, image data on a form is obtained as a monochrome binary image, and based on the binary image, characters are recognized. Accordingly, in color forms, which ruled-lines, background, guide characters and the like are printed thereon with colors other than dropout colors as described above, there reside such problems that, when ruled-lines, background, guide characters and the like are positioned adjacent to written characters, or when the written characters come into contact or cross with these ruled-lines, background or guide characters, recognition of the written characters is interfered resulting in a reduced character recognition ratio. Further, in the case where background color or solid coloring such as half-tone dot meshing is made on the character recognition target area, the character recognition is interfered resulting in a reduced character recognition ratio.

That is, in the conventional OCR technique, characters written in a solid colored area using a color other than dropout color, or likewise, characters, which are positioned adjacent to or come into contact with ruled-lines, background, guide characters or the like using a color other than dropout colors, are hardly recognized with high accuracy.

Further, with respect to color forms, which have spaces for filling with characters and having solid coloring and guide characters with various colors, and are originally not given with consideration about the character recognition by the OCR apparatus, if the character information written in the spaces for filling with characters can be read using an OCR apparatus, a high convenience can be expected.

SUMMARY OF THE INVENTION

The present invention has been proposed in view of the above mentioned problems. An object of the invention is to provide a method for recognizing characters written on color forms at a high accuracy.

In order to achieve the above object, a character recognition system according to the present invention, which extracts a character image from an original image including the character image and recognizes characters with respect to the character image, comprises: a background discriminating section that discriminates the background area based on the dispersion amount of color component and the frequency distribution with respect to color information in the original image, a non-character line discriminating section that discriminates non-character lines other than the characters and obtains non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating section that creates a first non-character line removed image in which the non-character lines are removed from the original image by, in the original image, replacing the non-character lines, which are discriminated by the non-character line discriminating section, with pixels having the same color component as that of the background, a first character area discriminating section that discriminates, in the first non-character line removed image, which is created by the first non-character line removed image creating section, the area other than the background area including the continuous pixels each having the same color characteristics and continuing more than a predetermined number, an enlarged image creating section that creates an enlarged image based on the original image, a second non-character line removed image creating section that creates a second non-character line removed image in which non-character lines are removed from the enlarged image by, in the enlarged image, which is created by the enlarged image creating section, replacing the non-character lines with a background pixels, which have the same color component as that of the background, based on the non-character line information, which is obtained by the non-character line discriminating section, an interference judgment section that judges, in the original image, whether or not the characters and the non-character line interfere with each other based on the non-character line information, which is obtained by the non-character line discriminating section and the character area, which is discriminated by the first character area discriminating section, a character image restoring section that, when the interference judgment section judges that the character image and the non-character line interfere with each other, restores the character image with respect to the interference point between the character image and the non-character line in the second non-character line removed image based on the difference between the color information with respect to the character image and the color information with respect to the non-character line, a second character area discriminating section that discriminates the area larger than a predetermined size, which is, in the second non-character line removed image, the area other than the background area including the continuous pixels each having the same color characteristics and continuing more than a predetermined number, as the character area, and a character recognizing section that digitizes the character area, where is discriminated by the second character area discriminating section and recognizes the characters.

The non-character line discriminating section may comprise: a non-character line location estimating section that calculates, with respect to the vertical direction and the horizontal direction of the original image respectively, the frequency distribution of the pixels, which have color information different from that of the pixels constituting the background area, and based on a result thereof, discriminates the location, which has a frequency larger than a predetermined value, as non-character line possible location, a color information determination section that determines the color information with respect to the non-character line based on the frequency distribution with respect to the color information in the non-character line possible location, which is discriminated by the non-character line location estimating section, and a non-character line information obtaining section that obtains the non-character line information with respect to the non-character line based on the continuity of the pixels with respect to the same color information as the color information, which is determined by the color information determination section.

The character image restoring section may form, with respect to the interference point between the character image and the non-character line in the second non-character line removed image, the character outline in the character image with spline curve based on the difference between the color information with respect to the character image and the color information with respect to the non-character line, and fills the area enclosed by the character outline with pixels having the same color information as the color information with respect to the character image.

Also, a character recognition method according to the present invention is a character recognition method for extracting a character image from an original image including the character image and recognizing characters with respect to the character image, comprises: a background discriminating step for discriminating the background area based on the dispersion amount of color component and the frequency distribution with respect to color information in the original image, a non-character line discriminating step for discriminating non-character lines other than the characters and obtaining non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating step for creating a first non-character line removed image in which the non-character lines are removed from the original image by, in the original image, replacing the non-character lines, which are discriminated in the non-character line discriminating step, with pixels having the same color component as that of the background, a first character area discriminating step for discriminating, in the first non-character line removed image, which is created in the first non-character line removed image creating step, the area other than the background area including the continuous pixels each having the same color characteristics and continuing more than a predetermined number, an enlarged image creating step for creating an enlarged image based on the original image, a second non-character line removed image creating step for creating a second non-character line removed image in which non-character lines are removed from the enlarged image by, in the enlarged image, which is created by the enlarged image creating step, replacing the non-character lines with a background pixels, which have the same color component as that of the background, based on the non-character line information, which is obtained in the non-character line discriminating step, an interference judgment step for judging, in the original image, whether or not the characters and the non-character line interfere with each other based on the non-character line information, which is obtained in the non-character line discriminating step and the character area, which is discriminated in the first character area discriminating step, a character image restoring step for, when it is judged in the interference judgment step that the character image and the non-character line interfere with each other, restoring the character image with respect to the interference point between the character image and the non-character line in the second non-character line removed image based on the difference between the color information with respect to the character image and the color information with respect to the non-character line, a second character area discriminating step for discriminating the area larger than a predetermined size, which is, in the second non-character line removed image, the area other than the background area including the continuous pixels each having the same color characteristics and continuing more than a predetermined number, as the character area, and a character recognizing step for digitizing the character area, where is discriminated in the second character area discriminating step and recognizing the characters.

The non-character line discriminating step may comprise a non-character line location estimating step for calculating, with respect to the vertical direction and the horizontal direction of the original image respectively, the frequency distribution of the pixels, which have color information different from that of the pixels constituting the background area, and based on a result thereof, discriminating the location, which has a frequency larger than a predetermined value, as non-character line possible location, a color information determination step for determining the color information with respect to the non-character line based on the frequency distribution with respect to the color information in the non-character line possible location, which is discriminated in the non-character line location estimating step, and a non-character line information obtaining step for obtaining the non-character line information with respect to the non-character line based on the continuity of the pixels with respect to the same color information as the color information, which is determined in the color information determination step.

The character image restoring step may form, with respect to the interference point between the character image and the non-character line in the second non-character line removed image, the character outline in the character image with spline curve based on the difference between the color information with respect to the character image and the color information with respect to the non-character line, and fills the area enclosed by the character outline with pixels having the same color information as the color information with respect to the character image.

Further, a character recognition program according to the present invention is a character recognition program for making a computer execute character recognition function to extract a character image from an original image including the character image and to recognize characters with respect to the character image, wherein the character recognition program instructs the computer to function as the following: a background discriminating section that discriminates the background area based on the dispersion amount of color component and the frequency distribution with respect to color information in the original image, a non-character line discriminating section that discriminates non-character lines other than the characters and obtains non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating section that creates a first non-character line removed image in which the non-character lines are removed from the original image by, in the original image, replacing the non-character lines, which are discriminated by the non-character line discriminating section, with pixels having the same color component as that of the background, a first character area discriminating section that discriminates, in the first non-character line removed image, which is created by the first non-character line removed image creating section, the area other than the background area including the continuous pixels each having the same color characteristics and continuing more than a predetermined number, as a character area, an enlarged image creating section that creates an enlarged image based on the original image, a second non-character line removed image creating section that creates a second non-character line removed image in which non-character lines are removed from the enlarged image by, in the enlarged image, which is created by the enlarged image creating section, replacing the non-character lines with a background pixels, which have the same color component as that of the background, based on the non-character line information, which is obtained by the non-character line discriminating section, an interference judgment section that judges, in the original image, whether or not the characters and the non-character line interfere with each other based on the non-character line information, which is obtained by the non-character line discriminating section and the character area, which is discriminated by the first character area discriminating section, a character image restoring section that, when the interference judgment section judges that the character image and the non-character line interfere with each other, restores the character image with respect to the interference point between the character image and the non-character line in the second non-character line removed image based on the difference between the color information with respect to the character image and the color information with respect to the non-character line, a second character area discriminating section that discriminates the area larger than a predetermined size, which is, in the second non-character line removed image, the area other than the background area including the continuous pixels each having the same color characteristics and continuing more than a predetermined number, as the character area, and a character recognizing section that digitizes the character area, where is discriminated by the second character area discriminating section and recognizes the characters.

When making the computer function as the non-character line discriminating section, the computer may be made to function as, a non-character line location estimating section that calculates, with respect to the vertical direction and the horizontal direction of the original image respectively, the frequency distribution of the pixels, which have color information different from that of the pixels constituting the background area, and based on a result thereof, discriminates the location, which has a frequency larger than a predetermined value, as non-character line possible location, a color information determination section that determines the color information with respect to the non-character line based on the frequency distribution with respect to the color information in the non-character line possible location, which is discriminated by the non-character line location estimating section, and a non-character line information obtaining section that obtains the non-character line information with respect to the non-character line based on the continuity of the pixels with respect to the same color information as the color information, which is determined by the color information determination section.

When making the computer function as the character image restoring section, the computer may be made to function to form, with respect to the interference point between the character image and the non-character line in the second non-character line removed image, the character outline in the character image with spline curve based on the difference between the color information with respect to the character image and the color information with respect to the non-character line, and fill the area enclosed by the character outline with pixels having the same color information as the color information with respect to the character image.

Further, the computer readable recording medium of the present invention is a medium in which the above-described character recognition program is recorded.

Furthermore, a medium processing apparatus, which recognizes characters based on a medium image read from a medium recording therein characters, comprises: a layout analyzing section that, based on the medium image, extracts the characteristics of layout of the medium image and analyzes the constitution of the layout, an original image creating section that, based on the result of the analysis by the layout analyzing section, creates an original image including a character image, which is subjected to the character recognition, a background discriminating section that discriminates the background area based on the dispersion amount of color component and the frequency distribution with respect to color information in the original image, a non-character line discriminating section that discriminates non-character lines other than the characters and obtains non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating section that creates a first non-character line removed image in which the non-character lines are removed from the original image by, in the original image, replacing the non-character lines, which are discriminated by the non-character line discriminating section, with pixels having the same color component as that of the background, a first character area discriminating section that discriminates, in the first non-character line removed image, which is created by the first non-character line removed image creating section, the area other than the background area including the continuous pixels each having the same color characteristics and continuing more than a predetermined number, an enlarged image creating section that creates an enlarged image based on the original image, a second non-character line removed image creating section that creates a second non-character line removed image in which non-character lines are removed from the enlarged image by, in the enlarged image, which is created by the enlarged image creating section, replacing the non-character lines with a background pixels, which have the same color component as that of the background, based on the non-character line information, which is obtained by the non-character line discriminating section, an interference judgment section that judges, in the original image, whether or not the characters and the non-character line interfere with each other based on the non-character line information, which is obtained by the non-character line discriminating section and the character area, which is discriminated by the first character area discriminating section, a character recognizing section that digitizes the character area, where is discriminated by the second character area discriminating section and recognizes the characters.

The non-character line discriminating section may comprise: a non-character line location estimating section that calculates, with respect to the vertical direction and the horizontal direction of the original image respectively, the frequency distribution of the pixels, which have color information different from that of the pixels constituting the background area, and based on a result thereof, discriminates the location, which has a frequency larger than a predetermined value, as non-character line possible location, a color information determination section that determines the color information with respect to the non-character line based on the frequency distribution with respect to the color information in the non-character line possible location, which is discriminated by the non-character line location estimating section, and a non-character line information obtaining section that obtains the non-character line information with respect to the non-character line based on the continuity of the pixels with respect to the same color information as the color information, which is determined by the color information determination section.

Still further, a medium processing method for recognizing characters based on a medium image read out from a medium recording therein the characters, comprises: a layout analyzing step for, based on medium image, extracting characteristics of layout of the medium image and analyzing the constitution of the layout, an original image creating step for, based on the analysis result in the layout analyzing step, creating an original image including a character image, which is subjected to the character recognition, a background discriminating step for discriminates the background area based on the dispersion amount of color component and the frequency distribution with respect to color information in the original image, a non-character line discriminating step for discriminating non-character lines other than the characters and obtaining non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating step for creating a first non-character line removed image in which the non-character lines are removed from the original image by, in the original image, replacing the non-character lines, which are discriminated in the non-character line discriminating step, with pixels having the same color component as that of the background, a first character area discriminating step for discriminating, in the first non-character line removed image, which is created in the first non-character line removed image creating step, the area other than the background area including the continuous pixels each having the same color characteristics and continuing more than a predetermined number, an enlarged image creating step for creating an enlarged image based on the original image, a second non-character line removed image creating step for creating a second non-character line removed image in which non-character lines are removed from the enlarged image by, in the enlarged image, which is created by the enlarged image creating step, replacing the non-character lines with a background pixels, which have the same color component as that of the background, based on the non-character line information, which is obtained in the non-character line discriminating step, an interference judgment step for judging, in the original image, whether or not the characters and the non-character line interfere with each other based on the non-character line information, which is obtained in the non-character line discriminating step and the character area, which is discriminated in the first character area discriminating step, a character image restoring step for, when it is judged in the interference judgment step that the character image and the non-character line interfere with each other, restoring the character image with respect to the interference point between the character image and the non-character line in the second non-character line removed image based on the difference between the color information with respect to the character image and the color information with respect to the non-character line, a second character area discriminating step for discriminating the area larger than a predetermined size, which is, in the second non-character line removed image, the area other than the background area including the continuous pixels each having the same color characteristics and continuing more than a predetermined number, as the character area, and a character recognizing step for digitizing the character area, where is discriminated in the second character area discriminating step and recognizing the characters.

The non-character line location discriminating step may comprise: a non-character line location estimating step for calculating, with respect to the vertical direction and the horizontal direction of the original image respectively, the frequency distribution of the pixels, which have color information different from that of the pixels constituting the background area, and based on a result thereof, discriminating the location, which has a frequency larger than a predetermined value, as non-character line possible location, a color information determination step for determining the color information with respect to the non-character line based on the frequency distribution with respect to the color information in the non-character line possible location, which is discriminated in the non-character line location estimating step, and a non-character line information obtaining step for obtaining the non-character line information with respect to the non-character line based on the continuity of the pixels with respect to the same color information as the color information, which is determined in the color information determination step.

Further, a medium processing program according to the invention for, based on a medium image read from a medium recording therein characters, making a computer execute a medium processing function to recognize the characters, wherein the medium processing program instructs the computer to function as the following: a layout analyzing section that, based on the medium image, extracts the characteristics of layout of the medium image and analyzes constitution of the layout, an original image creating section that, based on the analysis result by the layout analyzing section, creates an original image including a character image, which is subjected to the character recognition, a background discriminating section that discriminates the background area based on the dispersion amount of color component and the frequency distribution with respect to color information in the original image, a non-character line discriminating section that discriminates non-character lines other than the characters and obtains non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating section that creates a first non-character line removed image in which the non-character lines are removed from the original image by, in the original image, replacing the non-character lines, which are discriminated by the non-character line discriminating section, with pixels having the same color component as that of the background, a first character area discriminating section that discriminates, in the first non-character line removed Image, which is created by the first non-character line removed image creating section, the area other than the background area including the continuous pixels each having the same color characteristics and continuing more than a predetermined number, an enlarged image creating section that creates an enlarged image based on the original image, a second non-character line removed image creating section that creates a second non-character line removed image in which non-character lines are removed from the enlarged image by. In the enlarged image, which is created by the enlarged image creating section, replacing the non-character lines with a background pixels, which have the same color component as that of the background, based on the non-character line information, which is obtained by the non-character line discriminating section, an interference judgment section that judges, in the original image, whether or not the characters and the non-character line interfere with each other based on the non-character line information, which is obtained by the non-character line discriminating section and the character area, which is discriminated by the first character area discriminating section, a character image restoring section that, when the interference judgment section judges that the character image and the non-character line interfere with each other, restores the character image with respect to the interference point between the character image and the non-character line in the second non-character line removed image based on the difference between the color information with respect to the character image and the color information with respect to the non-character line, a second character area discriminating section that discriminates the area larger than a predetermined size, which is, in the second non-character line removed image, the area other than the background area including the continuous pixels each having the same color characteristics and continuing more than a predetermined number, as the character area, and a character recognizing section that digitizes the character area, where is discriminated by the second character area discriminating section and recognizes the characters.

When the medium processing program makes the computer function the non-character line discriminating section, the medium processing program may instruct the computer to function also as the following: a non-character line location estimating section that calculates, with respect to the vertical direction and the horizontal direction of the original image respectively, the frequency distribution of the pixels, which have color information different from that of the pixels constituting the background area, and based on a result thereof, discriminates the location, which has a frequency larger than a predetermined value, as non-character line possible location, a color information determination section that determines the color information with respect to the non-character line based on the frequency distribution with respect to the color information in the non-character line possible location, which is discriminated by the non-character line location estimating section, and a non-character line information obtaining section that obtains the non-character line information with respect to the non-character line based on the continuity of the pixels with respect to the same color information as the color information, which is determined by the color information determination section.

A computer readable recording medium according to the present invention is a computer readable recording medium, which records therein a medium processing program for, based on a medium image, which is read from a medium recording therein characters, making a computer execute a medium processing function to recognize the characters, wherein the medium processing program instructs the computer to function as the following: a layout analyzing section that, based on the medium image, extracts the characteristics of layout of the medium image and analyzes the constitution of the layout, an original image creating section that, based on the result of the analysis by the layout analyzing section, creates an original image including a character image, which is subjected to the character recognition, a background discriminating section that discriminates the background area based on the dispersion amount of color component and the frequency distribution with respect to color information in the original image, a non-character line discriminating section that discriminates non-character lines other than the characters and obtains non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating section that creates a first non-character line removed image in which the non-character lines are removed from the original image by, in the original image, replacing the non-character lines, which are discriminated by the non-character line discriminating section, with pixels having the same color component as that of the background, a first character area discriminating section that discriminates, in the first non-character line removed image, which is created by the first non-character line removed image creating section, the area other than the background area including the continuous pixels each having the same color characteristics and continuing more than a predetermined number, an enlarged image creating section that creates an enlarged image based on the original image, a second non-character line removed image creating section that creates a second non-character line removed image in which non-character lines are removed from the enlarged image by, in the enlarged image, which is created by the enlarged image creating section, replacing the non-character lines with a background pixels, which have the same color component as that of the background, based on the non-character line information, which is obtained by the non-character line discriminating section, an interference judgment section that judges, in the original image, whether or not the characters and the non-character line interfere with each other based on the non-character line information, which is obtained by the non-character line discriminating section and the character area, which is discriminated by the first character area discriminating section, a character image restoring section that, when the interference judgment section judges that the character image and the non-character line interfere with each other, restores the character image with respect to the interference point between the character image and the non-character line in the second non-character line removed image based on the difference between the color information with respect to the character image and the color information with respect to the non-character line, a second character area discriminating section that discriminates the area larger than a predetermined size, which is, in the second non-character line removed image, the area other than the background area including the continuous pixels each having the same color characteristics and continuing more than a predetermined number, as the character area, and a character recognizing section that digitizes the character area, where is discriminated by the second character area discriminating section and recognizes the characters.

When the medium processing program makes the computer function the non-character line discriminating section, the medium processing program may instruct the computer to function also as the following: a non-character line location estimating section that calculates, with respect to the vertical direction and the horizontal direction of the original image respectively, the frequency distribution of the pixels, which have color information different from that of the pixels constituting the background area, and based on a result thereof, discriminates the location, which has a frequency larger than a predetermined value, as non-character line possible location, a color information determination section that determines the color information with respect to the non-character line based on the frequency distribution with respect to the color information in the non-character line possible location, which is discriminated by the non-character line location estimating section, and a non-character line information obtaining section that obtains the non-character line information with respect to the non-character line based on the continuity of the pixels with respect to the same color information as the color information, which is determined by the color information determination section.

When the medium processing program may make the computer function the character image restoring section as the character image restoring section forms, with respect to the interference point between the character image and the non-character line in the second non-character line removed image, the character outline in the character image with spline curve based on the difference between the color information with respect to the character image and the color information with respect to the non-character line, and fills the area enclosed by the character outline with pixels having the same color information as the color information with respect to the character image.

According to the present invention, such advantage that characters written on color forms can be recognized at a high accuracy.

BRIEF DESCRIPTION OF THE DRAWINGS

FIGS. 2A, 2B, 2C and 2D are diagrams for illustrating a form to be discriminated by the form recognition apparatus;

FIG. 12 is a diagram showing an example of a character image in a ruled-line removal process in the form recognition apparatus in accordance with the embodiment of the present invention;

FIG. 13 is a diagram showing an example of a character image in a ruled-line removal process in the form recognition apparatus in accordance with the embodiment of the present invention;

FIG. 14 is a diagram showing an example of a character image in a ruled-line removal process in the form recognition apparatus in accordance with the embodiment of the present invention;

FIGS. 15A and 15B are diagrams respectively showing an example of a character image in a ruled-line removal process in the form recognition apparatus in accordance with the embodiment of the present invention;

DESCRIPTION OF THE PREFERRED EMBODIMENTS

Figure 1:
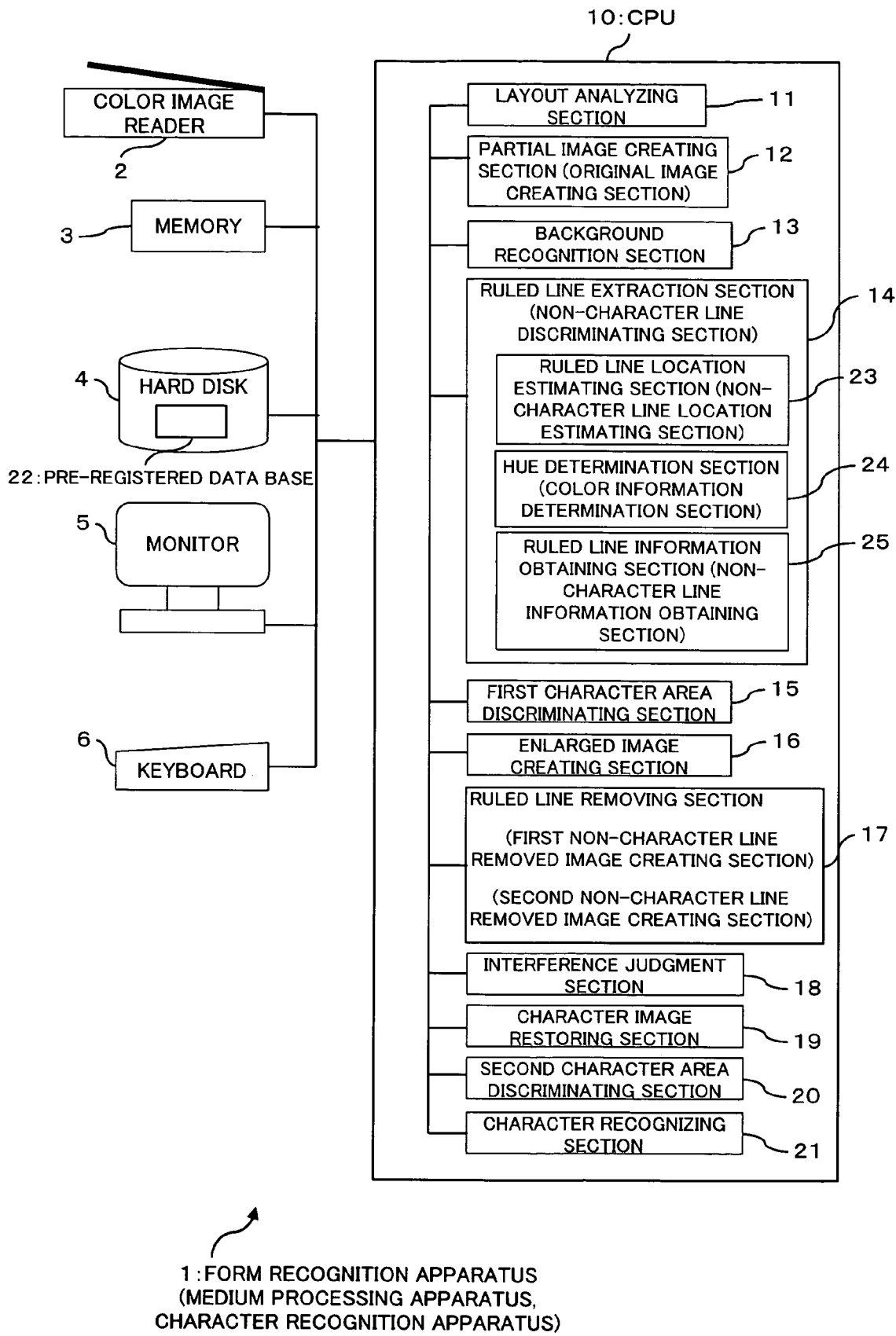
FIG. 1 is a diagram typically showing the configuration of a form recognition apparatus in accordance with an embodiment of the present invention.

Hereinafter, referring to the drawings, embodiments of the present invention will be described.

(A) Explanation of Embodiment

FIG. 1 is a diagram typically showing the configuration of a form recognition apparatus as an embodiment of the present invention; FIGS. 2A, 2B, 2C and 2D a view respectively illustrating a form, which is discriminated by the form recognition apparatus. FIG. 2A is a view showing a part of the form; FIG. 2B is a view showing characters thereon; FIG. 2C is a view showing a pre-printed portion thereof; and FIG. 2D is a view showing a background portion thereof.

The form recognition apparatus (medium processing apparatus; character recognition apparatus) 1 reads a form (medium), which is used, for example, in banking facilities, for recognizing characters written in predetermined columns. Particularly, the form recognition apparatus 1 recognizes the characters written on a color form of which pre-printed portion includes ruled-lines; background, guide characters and the like formed with colors different from colors of the characters and dropout colors.

In the form recognition apparatus 1, it is arranged so as to, with respect to the color form shown in FIG. 2A, based on the color information thereof, extract the character portion (refer to FIG. 2B) excluding background (refer to FIG. 2D) and pre-printed portion (refer to FIG. 2C) to recognize the characters. For example, in the examples shown in FIGS. 2A-2D, an example, which is a color form comprised of a pre-printed portion formed with a red color and characters written thereon with a blue color, is shown. Using such color information (hue and luminance), character images are extracted as the target to be recognized, and thus, the characters are recognized. Hereinafter, in this embodiment, the color form will be occasionally referred to simply as "form".

As shown in FIG. 1, the form recognition apparatus 1 comprises a color image reader 2, a memory 3, a hard disk 4, a monitor 5, a keyboard 6 and a CPU (Central Processing Unit) 10 as a computer system (information processing system); and is arranged so that the CPU 10 executes programs (character recognition program and medium processing program), which are stored in the memory 3 and the hard disk 4, thereby the form recognition apparatus 1 is made to perform the functions thereof.

The color image reader 2 reads out image data (medium image) from the color form. For example, an optical character reading apparatus (OCR apparatus) or an image scanner may be employed. And in the form recognition apparatus 1, the color image reader 2 reads out the image data from the color form in a color image or gray scale image (multi-value image).

The hard disk 4 stores image data of the form, which is read out by the color image reader 2, and stores the above-mentioned programs. Further, the hard disk 4 stores a pre-registered database 22.

Figure 18:
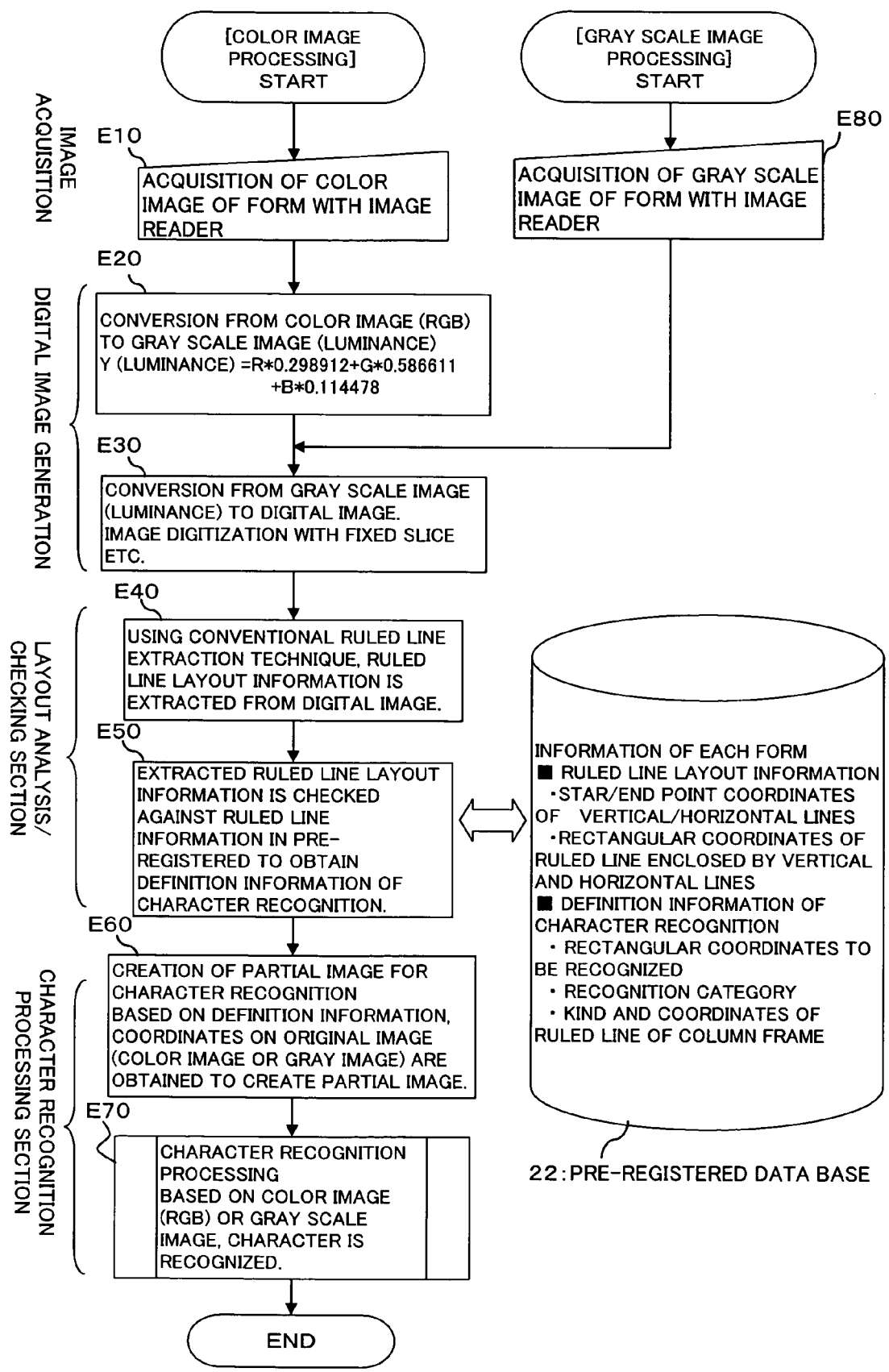
FIG. 18 is a flowchart illustrating the process with respect to the form recognition in the form recognition apparatus in accordance with the embodiment of the present invention.

The pre-registered database 22 includes information concerning the form such as layout information of ruled-line and definition information for character recognition, which are previously registered therein (refer to FIG. 18). As for the layout information of ruled-line, vertical and horizontal line-based coordinate positions of start point (start position) and end point (termination position) of the ruled-lines, which are formed with vertical lines and horizontal lines, rectangular coordinates of columns for items (ruled-line items) such as date columns and columns for writing the sum of money, which are provided to the form, are used. Also, as for the definition information for character recognition, rectangular coordinates as the target to be recognized, discriminating category (for example, a kind of character such as numbers, alphabet, Japanese hiragana-letters and the like), a kind of lines and coordinates of ruled-lines constituting the column frames, are used.

The memory 3 is one for developing the data or temporarily storing the data when the CPU 10 carries out various kinds of processing. And further, the above-mentioned program may be stored in the memory 3. The monitor 5 displays images of forms, results of character recognition and operation screens used by an operator. The keyboard 6 is provided for the operator to carry out various operations including inputting information.

The CPU 10 performs various operations and processing, and as shown in FIG. 1, performs the following functions; i.e., a layout analyzing section 11, a partial image creating section (original image creating section) 12, a background discriminating section 13, a ruled-line extracting section (non-character line discriminating section) 14, a first character area discriminating section 15, an enlarged image creating section 16, a ruled-line removing section (first non-character line removed image creating section, a second non-character line removed image creating section) 17, an interference judgment section 18, a character image restoring section 19, a second character area discriminating section 20 and a character recognizing section 21.

The layout analyzing section 11 extracts the characteristics of the layout of the image data and analyzes the configuration of the layout of the form based on the image data (medium image) of the form; and extracts the layout information of the ruled-line based on the image data of the form, and checks the extracted layout information of the ruled-line against the layout information of the ruled-line, which is registered in the pre-registered database 22, to obtain definition information for character recognition. The processing made by the layout analyzing section 11 can be achieved by, for example, a technique disclosed in Japanese patent No. 3088019 (title: medium processing apparatus and medium processing method).

Based on the result of analysis made by the layout analyzing section 11, the partial image creating section (original image creating section) 12 creates a partial image (original image) including character image, which is subjected to the character recognition; and based on the coordinates of an item or the like obtained by the layout analyzing section 11, which is the target of the character recognition, extracts a partial image (original image), which is subjected to the character recognition, from the image data of a form to create a partial image thereof.

Based on the dispersion amount of the color component in the partial image created by the partial image creating section 12, and the frequency distribution with respect to the color information, the background discriminating section 13 recognizes the background area.

Here, referring to FIGS. 3, 4A, 4B, 5A and 5B, the judgment technique of background color, which is made by the background discriminating section 13 in the form recognition apparatus 1, will be described in accordance with the flowchart (step A10-A70) shown in FIG. 6.

Figure 3:
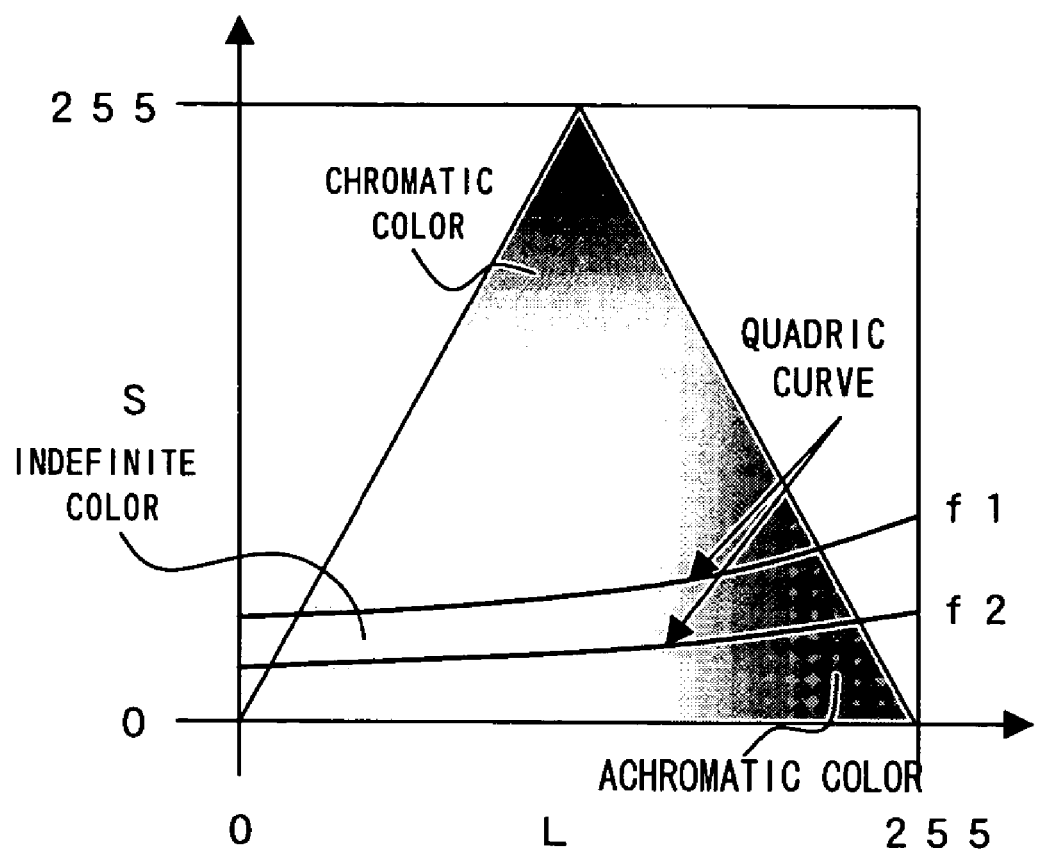
FIG. 3 is a diagram showing the relationship between the saturation S and the luminance L in a color of red.
Figures 4A, 4B:
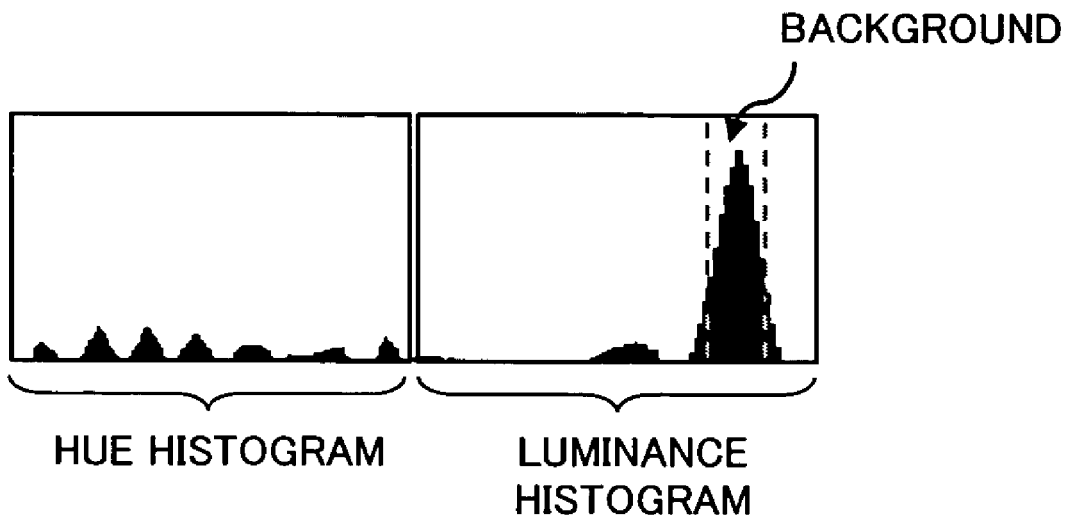
FIGS. 4A and 4B are diagrams respectively showing an example of a background histogram created by a background discriminating section 13 of the form recognition apparatus in accordance with the embodiment of the present invention.
Figures 5A, 5B:
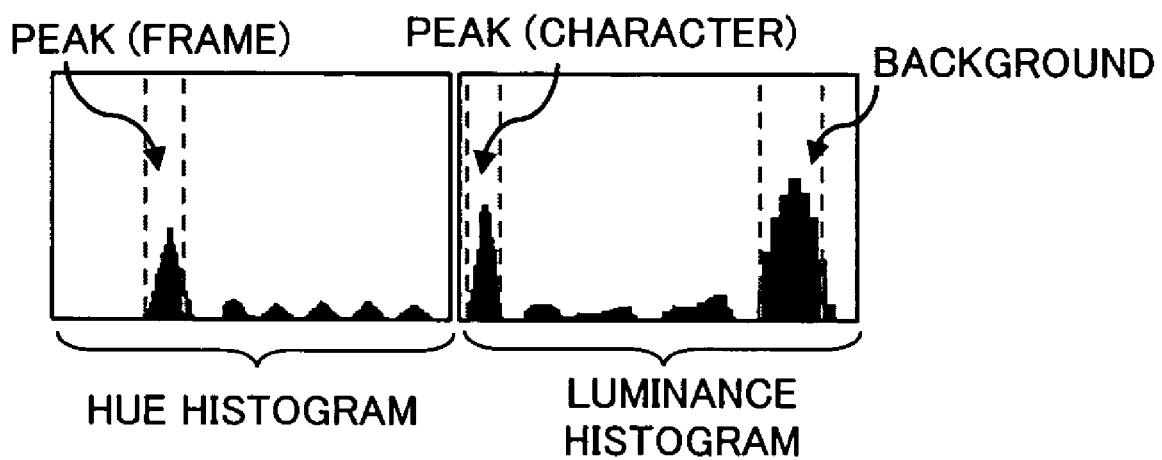
FIGS. 5A and 5B are diagrams respectively showing an example of a non-background histogram created by the background discriminating section 13 of the form recognition apparatus in accordance with the embodiment of the present invention.
Figure 6:
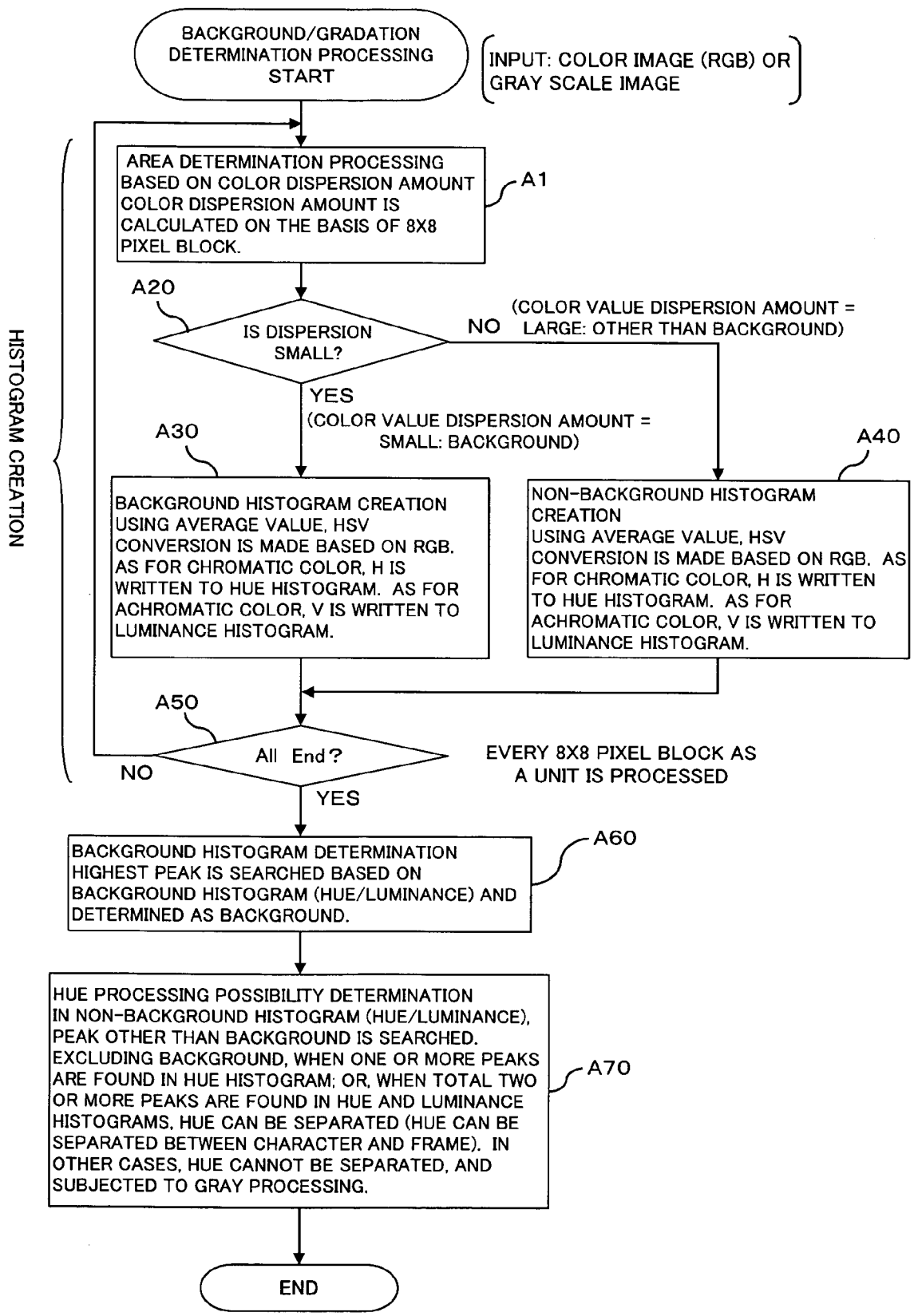
FIG. 6 is a flowchart illustrating a judgment technique of background color by a background discriminating section of the form recognition apparatus in accordance with the embodiment of the present invention.

FIG. 3 is a diagram showing, a relationship between the saturation S and the luminance L of red color; defining the ordinate axis as saturation S, and the abscissa axis as luminance L, FIGS. 4A, 4B, 5A, 5B are diagrams respectively showing an example of histogram, which is created by the background discriminating section 13 in the form recognition apparatus 1 as an embodiment of the present invention; FIG. 4A is a diagram showing an example of hue histogram of a background; FIG. 4B is a diagram showing an example of luminance histogram of the background; FIG. 5A is a diagram showing an example of hue histogram of the area excluding the background; and FIG. 5B is a diagram showing an example of luminance histogram of area excluding the background. FIGS. 4A and 4B respectively show an example of a case where the background is white color.

In an area of a predetermined size in the partial image (in this embodiment, a rectangular area of 8-pixel×8-pixel; hereinafter, this rectangular area of 8-pixel×8-pixel will be occasionally referred to as pixel block), the background discriminating section 13 calculates average values $R_{AVE}$, $G_{AVE}$ and $B_{AVE}$ of data (tone level) of each color of R (Red), G (Green) and B (Blue) of each pixel in the 8×8 pixel block. And from the difference between the R, G, B data of each pixel and the average values $R_{AVE}$, $G_{AVE}$ and $B_{AVE}$ of the R, G, B data of the 8×8 pixel area, the background discriminating section 13 calculates the dispersion amount of color value of the 8×8 pixel area. That is, in order to determine whether or not the pixels in the 8×8-pixel blocks, the background discriminating section 13 uses the deviation therebetween.

Using these values of $R_{AVE}$, $G_{AVE}$, $B_{AVE}$, R, G and B, the background discriminating section 13 calculates dispersion amount of color value of the pixels in the pixel block using the following expression (1) (step A10), and further, judges whether or not the dispersion amount of color value is small; i.e., whether or not the dispersion amount is smaller than a preset threshold (for example, 10) (step A20).

$$\text{Dispersion amount of color value} = \max(\Delta R, \Delta G, \Delta B) \quad (1)$$

where, $$\Delta R = |R_{AVE} - R|$$

$$\Delta G = |G_{AVE} - G|$$

$$\Delta B = |B_{AVE} - B|$$

It should be noted that MAX ( ) represents the maximum value of each value in the parentheses.

Based on the R, G, B values of the pixels, the background discriminating section 13 carries out HSV conversion using the following expression (2), converts these values into data comprised of hue H, saturation S and lightness L and judges whether each of the pixels is a chromatic color or an achromatic color.

$$S = (V - X)/V \quad (2)$$

where, $$V = \max(R, G, B)$$

$$X = \min(R, G, B)$$

Min ( ) represents the minimum value of each value in the parentheses.

Also, H is represented by the following expression.

When $R = V$, $H = (pi/3)*(b - g)$

When $G = V$, $H = (pi/3)*(2 + r - b)$

When $B = V$, $H = (pi/3)*(4 + g - r)$ $$L = (\max(R, G, B) + \min(R, G, B))/2$$

where, $$r = (V - R)/(V - X)$$

$$g = (V - G)/(V - X)$$

$$b = (V - B)/(V - X)$$

pi is circle ratio and,

H: 0 to 360
S: 0 to 1
V: 0 to 1
L: 0 to 1
R, G, B: 0 to 1

Here, when the dispersion amount of color value is small (for example, less than 10), (refer to YES route in step A20), it is judged that the pixel constitutes the background. When the dispersion amount of color value large (for example, 10 or more) (refer to NO route in step A20), it is judged that the pixel constitutes the area other than the background.

Further, with respect to the partial image, the background discriminating section 13 creates histograms for the pixel, which is judged as constituting the background and for the pixel, which is judged as constituting the area other than the background, respectively. Furthermore, these histograms created separate histograms for chromatic color and achromatic color (hue histogram, luminance histogram) (refer to step A30 and A40 in FIGS. 4A, 4B and FIGS. 5A and 5B).

In FIG. 3, the larger value of the saturation S on the ordinate axis represents the more vibrant color; and the larger value of the luminance L on the abscissa axis represents brighter color. Quadric curves f1 is a curve representing the boundary of chromatic color; and quadric curves f2 is a curve representing the boundary of achromatic color. The color between the quadric curves f1 and f2 is an indefinite color, which cannot be judged as either chromatic color or achromatic color.

These quadric curves f1 and f2 are represented by the following expressions (3) and (4).

$$f1 = (1/4000)(255 - \text{LUM})^2 + 10 \quad (3)$$

$$f2 = (1/2)(1/4000)(255 - \text{LUM})^2 + 10 \quad (4)$$

When the saturation S and the luminance L (LUM) of the pixel is determined, using the above expression (3), the lower limit value of the saturation S, which is resulted in the chromatic color in that lightness, can be calculated. Accordingly, based on a criterion whether or not the saturation S is larger than the lower limit value, it is judged whether or not the pixel is chromatic color. Further, using the above expression (4), the upper limit value of achromatic color in the lightness can be calculated. Accordingly, based on a criterion whether or not the saturation S is smaller than the upper limit value, it is judged whether or not the pixel is achromatic color. Hereinafter, to classify the chromatic color and the achromatic color and indefinite color will be occasionally referred to as hue cluster classification.

It may be arranged so that, the value of the quadric curve f1, which represents the lower limit value of chromatic color, and the value of the quadric curve f2, which represents the upper limit value of achromatic color, are calculated with respect to the luminance LUM, and judgment table of chromatic color and the judgment table of achromatic color may be created respectively for judging them using these judgment tables.

As shown in FIG. 4A and FIG. 5A, when the pixel is a chromatic color, the background discriminating section 13 reflects the hue H of the pixel on the hue histogram; when the pixel is an achromatic color, as shown in FIG. 4B and FIG. 5B, the background discriminating section 13 reflects the luminance of the pixel on the luminance histogram. That is, the number of appearance times of the value of hue H of chromatic color is counted and hue histogram (hue histogram of chromatic color) is created; the number of appearance times of the value of luminance of the achromatic color is counted and luminance histogram (histogram of achromatic color) is created.

With respect to the every pixel constituting the 8×8 pixel block, the background discriminating section 13 carries out the processing in steps A10 through A40, and with respect to every pixel block in the partial image, judges whether or not the processing in steps A10 through A40 has been made (step A50). When the processing has not completed on every pixel block, the processing returns to step A10 (refer to NO route instep A50). When the processing has completed on every pixel (refer to YES route in step A50), the background discriminating section 13 searches for peak value in the background histogram (hue histogram, luminance histogram) and recognizes that the hue and luminance of which number of appearance times is the peak value as background color (step A60).

The examples shown in FIGS. 4A and 4B illustrate a state that, a peak value is detected at a luminance, which represents white color in the luminance histogram. From this, it is understood that the background is white.

In the form recognition apparatus 1, in the above-described steps A30 and A40, when the pixel is a chromatic color, hue histogram is created; and when the pixel is an achromatic color, luminance histogram is created. Thereby, the frequency of pixel of an achromatic color such as white color also can be detected. Owing to this, even when the background color is a chromatic color or an achromatic color, the background can be recognized.

Then, based on the histogram of the area other than the background, which is created in step A40 (refer to FIGS. 5A and 5B), with respect to the area other than the background in the partial pixel, the background discriminating section 13 judges whether or not a technique, which uses the hue for discriminating the character and the ruled-line (hue separation, which will be described later in detail) can be applied thereto (step A70). To be more precise, based on the non-background histogram, the background discriminating section 13 searches for peak value (peak in the histogram) other than the hue value/luminance value, which has been recognized as the background instep A60. When there reside one or more peaks other than the background in the hue histogram, and when there reside two or more peaks in total in the hue histogram and the luminance histogram, the background discriminating section 13 judges that hue separation (hue processing, which will be described later) can be carried out. When the number of the peaks does not meet the above conditions in the histograms of the area other than background, the background discriminating section 13 judges that the hue separation is impossible, and thus, it is necessary to carry out separation (gray processing) based on the luminance value, which will be described later.

The ruled-line extracting section (non-character line discriminating section) 14 recognizes the ruled-line (non-character line) other than the character and obtains and extracts ruled-line information (non-character line information) based on, in the partial image, frequency distribution of the pixels, which have color information different from the pixels constituting the background area, and continuous pixels, of which pixels have the same color characteristics each other, continue more than predetermined number.

The ruled-line extracting section 14 includes a ruled-line location estimating section (non-character line location estimating section) 23, which, with respect to the vertical direction and the horizontal direction of the partial image, calculates the frequency distribution of the pixels, which have color information different from that of the pixels constituting the background area; and based on the result of the above, recognizes a location, which has a frequency more than a predetermined value, as a possible location (non-character line possible location) of a ruled-line.

Further, the ruled-line extracting section 14 includes a hue determination section (color information determination section) 24, which determines hue (color information) of the ruled-line based on the hue histogram (frequency distribution of the color information) in the possible location of the ruled-line, which is recognized by the ruled-line location estimating section 23, and a ruled-line information obtaining section (non-character line information obtaining section) 25, which obtains ruled-line information of the ruled-line based on the continuity of the pixels with respect to the same hue as the hue, which is determined by the hue determination section 24.

Figures 7A, 7B:
FIGS. 7A, 7B and 7C are diagrams respectively showing an example of a histogram in the vertical direction and horizontal direction of a partial image.
Figure 7C:
Figure 8:
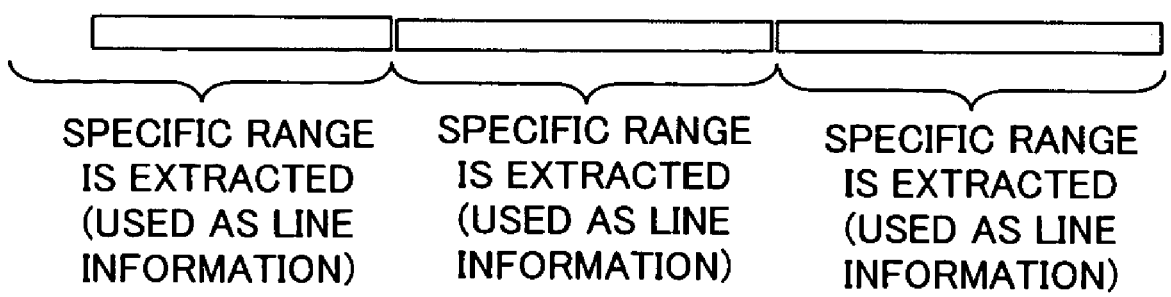
FIG. 8 is a diagram illustrating a creating technique of a ruled-line (horizontal line) in the form recognition apparatus in accordance with the embodiment of the present invention.
Figure 9A:
FIGS. 9A and 9B are diagrams respectively illustrating a creating technique of a ruled-line (horizontal line) in the form recognition apparatus in accordance with the embodiment of the present invention.
Figure 9B:
Figure 10:
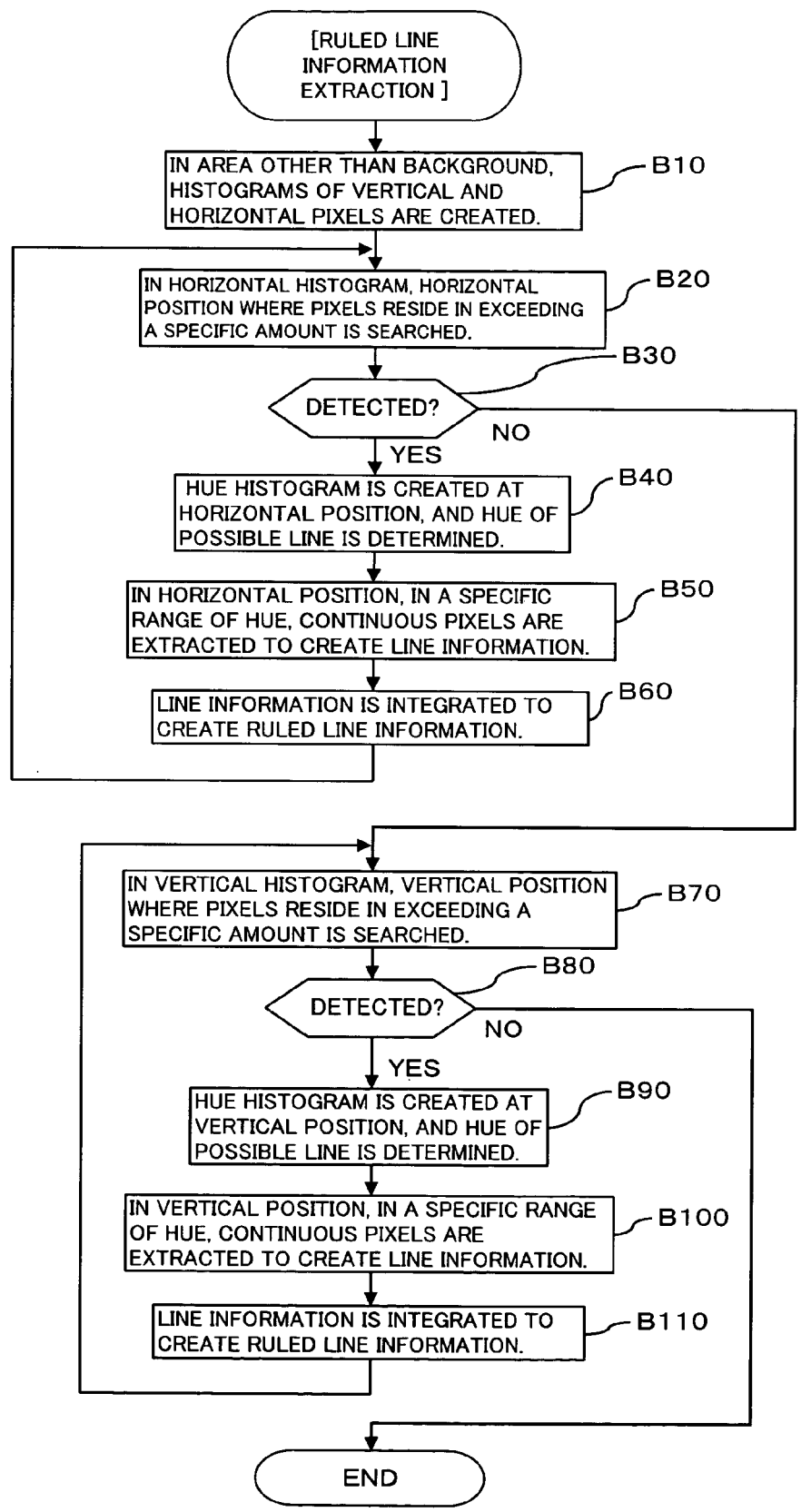
FIG. 10 is a flowchart illustrating an extracting technique of ruled-line information by a ruled-line extracting section in the form recognition apparatus in accordance with the embodiment of the present invention.

Referring to FIGS. 7A, 7B and 7C, FIG. 8, FIGS. 9A and 9B, extracting technique of the ruled-line information by the ruled-line extracting section 14 in the form recognition apparatus 1 will be described in accordance with the flowchart (step B10-B110) shown in FIG. 10. FIGS. 7A, 7B and 7C are diagrams showing an example of a histogram in the vertical direction and the horizontal direction of the partial image. FIG. 7A is a diagram showing an example of the partial image; FIG. 7B is a diagram showing an example of the histogram of the pixels in the horizontal direction; FIG. 7C is a diagram showing an example of the histogram of the pixels in the vertical direction. FIG. 8 and FIGS. 9A and 9B are diagrams for illustrating a creating technique of a ruled-line (horizontal line) respectively. FIG. 8 is a diagram showing an example of segment information; and FIGS. 9A and 9B are diagrams for illustrating a technique for creating line information based on the segment information shown in FIG. 8.

With respect to a partial image (refer to FIG. 7A), which is created by the partial image creating section 12, the ruled-line extracting section 14 creates a histogram of the pixels in the horizontal direction with respect to the area other than the background in the partial image (refer to FIG. 7B) and a histogram (refer to FIG. 7C) thereon in the vertical direction (step B10).

The ruled-line extracting section 14, first of all, in the histogram (refer to FIG. 7B) in the horizontal direction searches for location (horizontal location), which has the appearance frequency more than a predetermine amount (step B20), and judges whether or not any horizontal location that has the appearance frequency having such predetermine amount has been detected (step B30). In the case where such location has been detected in the histogram in the horizontal direction (refer to YES route in step B30)., the ruled-line location estimating section 23 judges that there resides a possible ruled-line in the partial image in the horizontal location thereof (non-character line location estimating step). The ruled-line extracting section 14 creates hue histogram of each pixels positioned in the horizontal location, at the horizontal location of the partial image, and the hue determination section 24 determines the hue value, which has the highest appearance frequency in the hue histogram, as the hue of the ruled-line (step B40, color information determination step).

With respect to the pixels residing in the horizontal location in the partial image, which is judged that the possible ruled-line is included in step B40, the ruled-line information obtaining section 25, extracts pixels, which are the pixels having the hue value determined in step B40 and continuing more than a predetermined number (continuous pixels) at specific ranges, creates the continuous pixels as the horizontal line (segment, segment information) respectively (step B50; refer to FIG. 8).

In the example shown in FIG. 8, the ruled-line extracting section 14 extracts the continuous pixels as segment information within a specific range (predetermined length) to obtain a plurality of segments. Thus, by obtaining plural pieces of the segment information having a predetermined length, it is possible to prevent the inclination from being generated, and thus, the positional displacement and the like of the ruled-line is prevented from occurring resulting in an increased read-out quality.

The ruled-line extracting section 14 integrates the plural pieces of segment information (connects to each other), which have been created in step B50 (refer to FIG. 9A), to create a piece of ruled-line information (step B60; refer to FIG. 9B), and returns to step B20. That is, the ruled-line extracting section 14 creates the line information based on the horizontal line, which has been created in step B50 (non-character line information obtaining step).

Also, in the case where, in the histogram in the horizontal direction, the processing has been completed with respect to every horizontal locations, which has the appearance frequency more than a predetermine amount, and when any horizontal location that has not been subjected to the ruled-line information creating processing is not detected (refer to NO route in step B30), in this case, in the histogram in the vertical direction (refer to FIG. 7C), locations (vertical location), which have appearance frequency more than a predetermine amount, are searched (step B70), and it is judged whether or not the vertical locations, which have the appearance frequency more than the predetermine amount, have been detected (step B80). When such location is detected in the histogram in the vertical direction (refer to YES route in step B80), the ruled-line location estimating section 23 judges that there resides a possible ruled-line in the vertical location of the partial image. The ruled-line extracting section 14 creates, at the vertical location in the partial image, a hue histogram of the pixels, which are positioned in the vertical location, and the hue determination section 24 determines the hue value, which has the highest appearance frequency in the hue histogram, as the hue of the ruled-line (step B90).

Further, with respect to the pixels in the vertical location of the partial image, which has been judged in step B90 that a possible ruled-line is included, in this case, the ruled-line information obtaining section 25 extracts the pixels (continuous pixels), which are the pixels having the hue value determined in step B90 and continue more than a predetermined number at specific ranges, and creates continuous pixels as the vertical segment (segment, segment information) (step B100).

And the ruled-line extracting section 14 integrates (connects to each other) the pieces of segment information, which are created in step B100 to create a piece of ruled-line information (step B110), and returns to step B70. That is, the ruled-line extracting section 14 creates a piece of line information based on the horizontal line, which is created in step B100. On the other hand, in the histogram of the vertical direction, when the processing has completed on every vertical location that has the appearance frequency more than a predetermine amount, and when no vertical location that has not been subjected to the ruled-line creating processing is detected (refer to NO route in step B80), the processing is terminated.

The ruled-line removing section (first non-character line removed image creating section, second non-character line removed image creating section) 17 replaces the ruled-line, which is recognized by the ruled-line extracting section 14 in the partial image with pixels, which have the same color component as that of the background and removes the ruled-line to create a first ruled-line removed image (first non-character line removed image).

In addition to the first non-character line removed image creating section that, using the above-described technique, removes the ruled-line from the partial image and creates the first ruled-line removed image, the ruled-line removing section 17, also in the an enlarged image, which is created by an enlarged image creating section 16 (will be described later), serves as a second non-character line removed image creating section that removes ruled-line from the enlarged image and creates a second ruled-line removed image (second non-character line removed image). Hereinafter, deletion of the ruled-line with respect to the creation of the first ruled-line removed image may be referred to as first removal, and the deletion of the ruled-line with respect to the creation of the second ruled-line removed image may be referred to as second removal.

The first character area discriminating section 15 recognizes, in the first ruled-line removed image created by the ruled-line removing section 17, an area other than the background area thereof, where the continuous pixels, which have the same hue (color characteristics) each other, continue more than a predetermined number, as the character area, and recognizes the hue thereof as the character's hue.

The enlarged image creating section 16 creates enlarged image based on the partial image. In the form recognition apparatus 1, the enlarged image creating section 16 converts the pixels constituting the partial image into sub-pixels to create an enlarged image. The wording "to convert pixels into sub-pixels" means a processing to virtually divide each of the pixels constituting the partial image into plural pixels or, to replace the same with plural pixels.

Figures 11A, 11B:
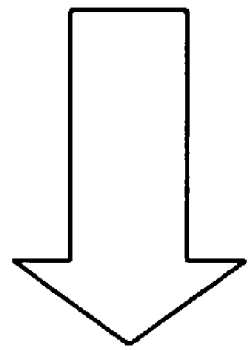
FIGS. 11A and 11B are diagrams illustrating an example of a creating technique of an enlarged image by an enlarged image creating section in the form recognition apparatus in accordance with the embodiment of the present invention.

FIGS. 11A and 11B are diagrams for illustrating an example of an enlarged image creating technique by the enlarged image creating section 16 in the form recognition apparatus 1. FIG. 11A is a diagram showing a state of an image before being enlarged; FIG. 11B is a diagram showing an example of a state of an enlarged image. When enlarging an image (original image) of 3×3 pixels shown in FIG. 11A to an image (enlarged image) of 5×5 pixels shown in FIG. 11B by converting the pixels into sub-pixels, first of all, the respective pixels constituting the original image are disposed leaving such space that a predetermined number of pixels (in the example shown in Fig. 11B: one pixel) can be disposed between the neighboring pixels so as to copy the same into the enlarged image (coordinate conversion).

Then, areas (spaces) between the pixels constituting the enlarged image are supplemented. To be more precise, to the pixels, which are disposed in the areas in these spaces, average values of the pixels of the original image, which previously constituted the spaces, are set as the pixel values (hue). For example, in the example shown in FIG. 11B, to a pixel given with a reference symbol ①, an average value of the pixels (pixels 1-1 and 1-2), which neighbor to each other in the right and left direction, is set; and to a pixel given with a reference symbol ②, an average value of the pixels (pixels 1-1 and 2-1), which neighbor to each other in the vertical direction, is set. Further, to a pixel given with a reference symbol ③, an average value among the pixels (pixel 1-1, 1-2, 2-1 and 2-2) enclosing the pixel is set. That is, the enlarged image creating section 16 performs the processing as described above on each of the pixels constituting the partial image to create the enlarged image of the partial image.

The technique of creating enlarged image by the enlarged image creating section 16 is not limited to the above-described method. Within a rage that does not deviate from the spirit of the present invention, various modifications are applicable.

Based on the ruled-line information obtained by the ruled-line extracting section 14 and the character area recognized by the first character area discriminating section 15, the interference judgment section 18 judges whether or not the character and the ruled-line interfere (come into contact or overlap) with each other in the partial image. To be more precise, the ruled-line information obtained by the ruled-line extracting section 14 is compared with the character area recognized by the first character area discriminating section 15 to determine the location where the ruled-line and the character might interfere with each other. Then, in the enlarged image created by the enlarged image creating section 16, it is judged that a point where pixels having the same hue as that of the ruled-line and pixels having the same hue as that of the character neighbor with each other is the point where the character and the ruled-line interfere with each other.

When it is judged that the character image and the ruled-line interfere with each other by the interference judgment section 18, the character image restoring section 19 restores the character image based on the difference between the hue of the character image and the hue of the ruled-line with respect to the interference point between the character image and the ruled-line in the second ruled-line removed image.

In the form recognition apparatus 1, in the case where the character image and the ruled-line interfere (overlap) with each other (refer to FIG. 12), when the ruled-line is remove from the enlarged image by the ruled-line removing section 17, in the second ruled-line removed image, in the character image, a character image of the portion (interference point), which overlaps with the ruled-line, is deleted along with the ruled-line and a character image (refer to FIG. 13) in which a part thereof is missing therefrom is formed. The character image restoring section 19 restores the character image of which part is deleted therefrom to a state having no lack.

To be more precise, the character image restoring section 19, first of all, refers to the second ruled-line removed image and the judgment result by the interference judgment section 18, and obtains the location (the location where the character and the ruled-line interfere with each other; hereinafter, occasionally referred to as missing location), where the character image is partially deleted in the second ruled-line removed image, using the difference in the hue between the character and the ruled-line in the missing location and referring to the enlarged character image and restores the character outline in the missing location.

That is, with respect to the location equivalent to the missing location in the enlarged image, where the hue of the character and the hue of the ruled-line are different from each other and continues more than predetermined pixels, the character image restoring section 19 recognizes the portion as the boundary between the character and the ruled-line. The character image restoring section 19 plots the missing location in the enlarged image to set the outline of the character. Further, the character image restoring section 19 connects the character outline with spline curves to form the character outline smoothly.

The character image restoring section 19 fills the inner area of the character outline (inside of the character), which is formed as described above, with pixels, which have the same hue as the hue recognized as the hue of the character by the first character area discriminating section 15; thus the character image is restored.

Figure 16:
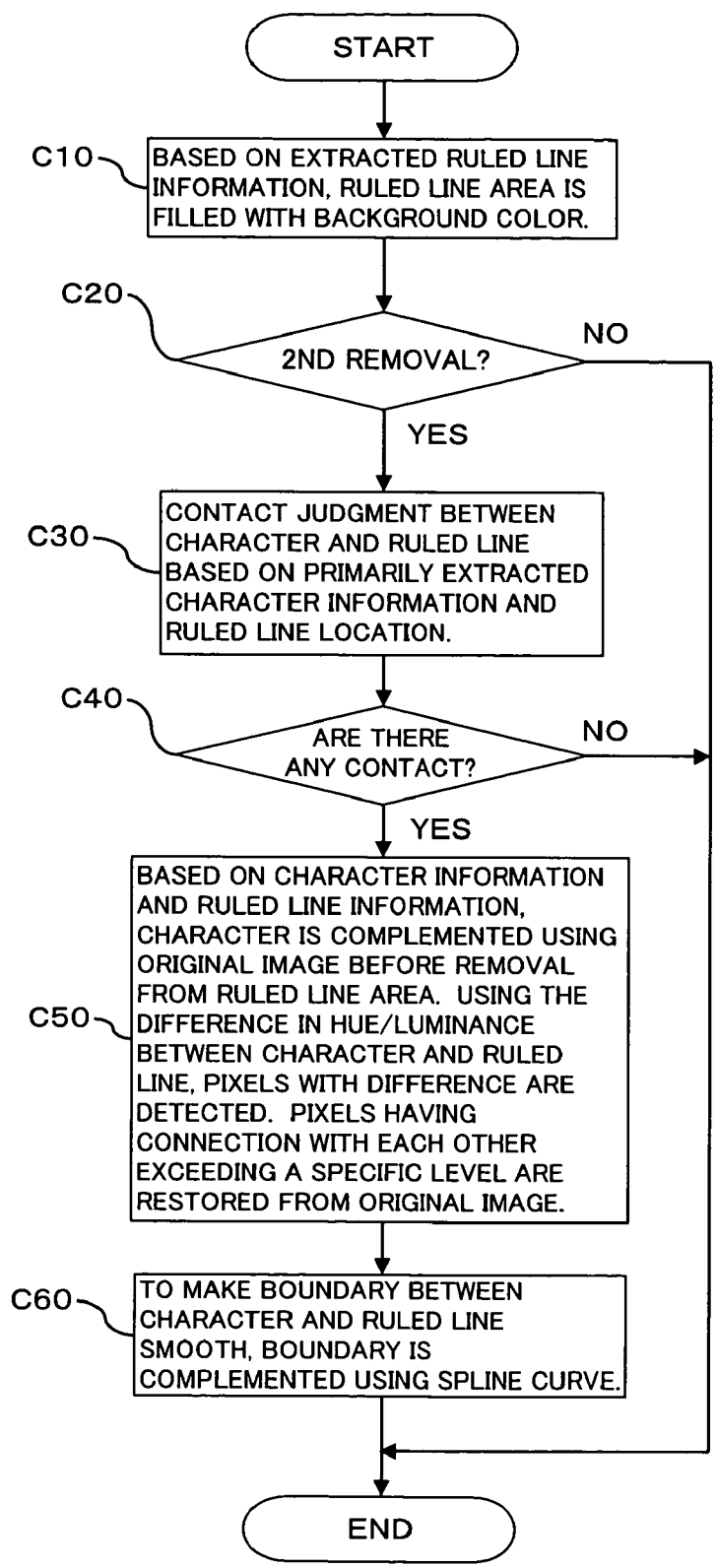
FIG. 16 is a flowchart illustrating the process from the ruled-line removal processing to the character image restoring processing in the form recognition apparatus in accordance with the embodiment of the present invention.

Referring to FIG. 12-FIG. 15, the processing from the ruled-line removal to the restoring of the character image in the form recognition apparatus 1 will be described in accordance with the flowchart (steps C10-C60) shown in FIG. 16. FIG. 12-FIG. 15 are diagrams respectively showing an example of a character image in the process of ruled-line removal.

As shown in FIG. 12, in the image (partial image, enlarged image) to be subjected to the removal of the ruled-line, based on the ruled-line information obtained by the ruled-line information obtaining section 25, the ruled-line removing section 17 replaces the pixels constituting the ruled-line recognized by the ruled-line extracting section 14 with pixels, which have the same color as that of the background; thereby the ruled-line area is filled with the background color to delete the ruled-line (step C10).

Then, the ruled-line removing section 17 judges whether or not the deletion is the secondary removal (step C20). If it is not the secondary removal (refer to NO route in step C20), the processing is terminated. If it is the secondary removal (refer to YES route in step C20), based on the ruled-line information obtained by the ruled-line extracting section 14 and the character area recognized by the first character area discriminating section 15, interference judgment section 18 judges whether or not the character and the ruled-line interfere (come into contact or overlap) with each other in the partial image (step C30).

Based on the judgment result whether the character and the ruled-line interfere (come in contact or overlap) with each other in the partial image (step C40), when the character and the ruled-line interfere with each other (refer to YES route in step C40 in FIG. 12), a character image from which a part thereof is missing is formed by the deletion of the ruled-line in step C10 (refer to FIG. 13). The character image restoring section 19 restores the character image (refer to step C50 and FIG. 14), and supplements the boundary portion between the character and the ruled-line (refer to FIG. 15A) using spline curves to create a smooth character image (refer to step C60 and FIG. 15B). On the other hand, when the character and the ruled-line do not interfere with each other (refer to NO route in step C40), the processing is terminated.

The second character area discriminating section 20 recognizes the following area as the character area; i.e., in the second ruled-line removed image, the area having a predetermined size or more, which is the area other than the background area and includes continuous pixels in which pixels having the same hue continue more than a predetermined number. With respect to the character area recognized by the second character area discriminating section 20, the character recognizing section 21 digitizes the character image restored by the character image restoring section 19 and recognizes the character. This is achieved by, for example, a known OCR technique.

Figure 17:
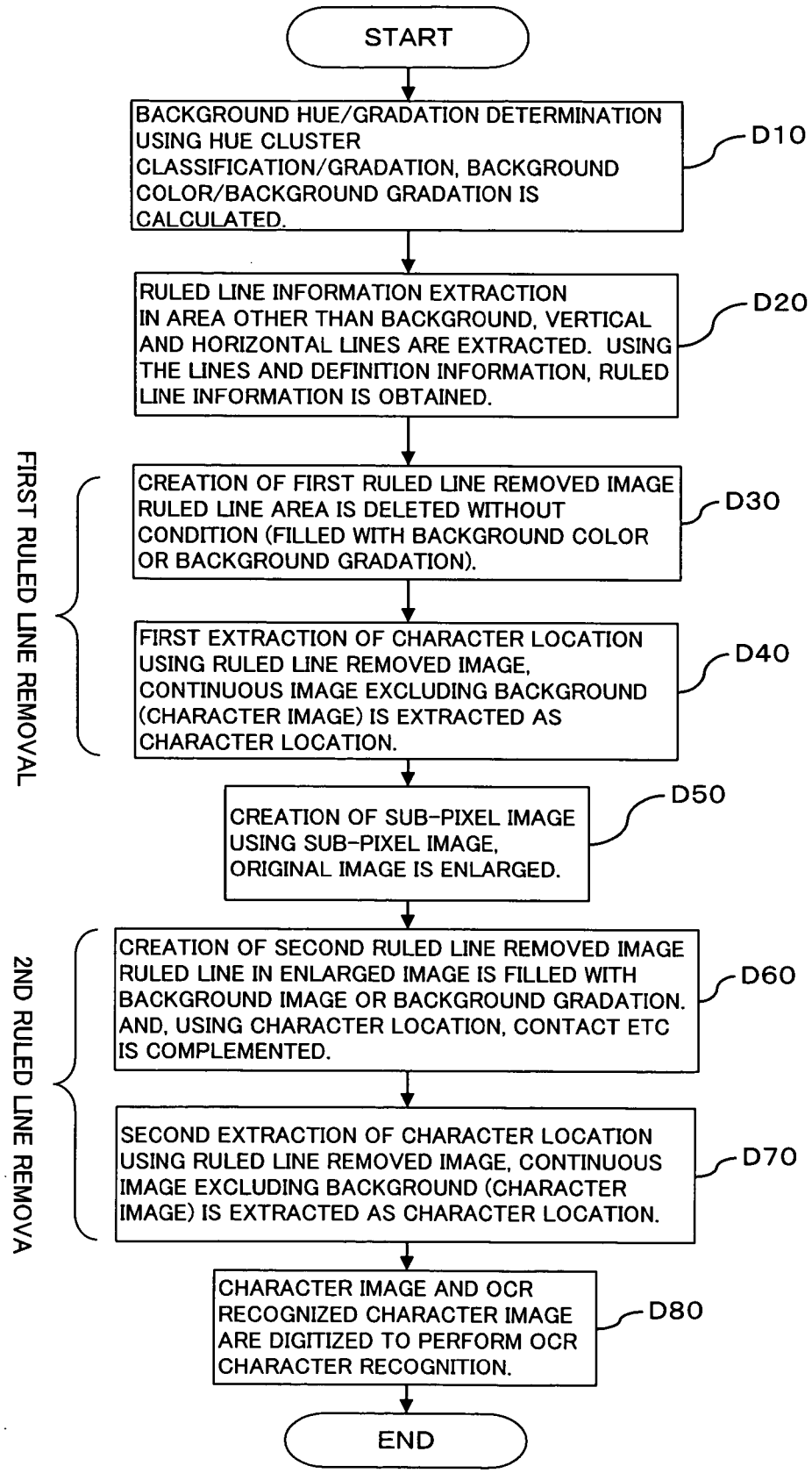
FIG. 17 is a flowchart illustrating character recognition processing in the form recognition apparatus in accordance with the embodiment of the present invention.

In accordance with the flowchart (step D10-D80) shown in FIG. 17, the character recognition processing in the form recognition apparatus 1 as one embodiment of the present invention will be described.

First of all, the background discriminating section 13 obtains the background color using the hue cluster classification or the like (step D10; background discriminating step), and the ruled-line extracting section 14, extracts the ruled-line information (step D20; non-character line discriminating step). Then, the ruled-line removing section 17 removes the ruled-line (first removal) from the partial image, and creates the first ruled-line removed image (step D30; first non-character line removed image creating step), and the first character area discriminating section 15 discriminates the character area in the first ruled-line removed image created by the ruled-line removing section 17, and recognizes the hue of the character (step D40; first character area discriminating step).

Based on the partial image, the enlarged image creating section 16 creates the enlarged image (step D50; enlarged image creating step), and the ruled-line removing section 17 removes the ruled-line from the enlarged image (secondary removal), thereby the second ruled-line removed image is created (step D60; second non-character line removed image creating step). At this time, when it is judged that the character and the ruled-line interfere with each other by the interference judgment section 18 (interference judgment section), the character image restoring section 19 restores character image, which has a missing portion due to the secondary removal (character image restoring step).

Then, the second character area discriminating section 20 discriminates the character area (extraction) (step D70; second character area discriminating step); and with respect to the character area recognized by the second character area discriminating section 20, the character recognizing section 21 digitizes the character image and recognizes the characters (step D80; character recognition step).

The present invention is not limited to the above-described embodiment, but within a range that does not deviate from the spirit of the present invention, various modifications may be employed.

For example, in the above embodiment, image data of the a color form is obtained as a color image; and the tone level (R, G and B), hue, luminance thereof are used as color component or color information; thus, images of the background, the ruled-lines and the characters are extracted. However, the invention is not limited to the above. It may be arranged so that, image data of a color form is obtained as a gray scale data (monochrome multi-gradation image), and using the luminance thereof as the color information, the image of the background, ruled-lines and characters may be extracted.

As described above, when the image data of the color form is obtained as gray scale data, in place of hue, luminance (luminance gradation) is used as color information, thereby the same working-effect as that of the above-described embodiment can be obtained. Also, when the judgment technique of the background color by the background discriminating section 13 shown in FIG. 6 is carried out based on the gray scale image, only the luminance histogram of the background histogram is created.

Here, the processing with respect to form recognition in the form recognition apparatus 1 as an embodiment of the present invention will be described in accordance with the flowchart (step E10-E80) shown in FIG. 18. In this example, it is possible to select one technique from the following two different techniques; i.e., the image data of the color form is processed using a color image; and the image data of the color form is processed using a gray scale image.

When processing the image data of the color form using a color image, first of all, the form recognition apparatus 1 obtains a color image of the color form with the color image reader 2 (step E10), and converts the obtained color image (R, G and B) to gray scale image (luminance) (step E20). For calculating the luminance Y using each value R, G and B of the color image, for example, the following conversion formula is applicable.

$$Y \text{ (luminance)} = R \times 0.298912 + G \times 0.586611 + B \times 0.114478$$

Then, the gray scale image (luminance) is converted to a binary image (step E30). The conversion from the gray scale image to the binary image (binarization of image) can be carried out by using a known technique such as fixed slicing method or the like.

On the other hand, when processing the image data of the color form using the gray scale, the form recognition apparatus 1 obtains a gray scale image of the color form with the color image data 2 (step E80), and the process goes to step E30.

Then, for example, using the technique disclosed in Japanese Patent No. 3088019, the layout analyzing section 11, extracts layout information of ruled-line based on digitized image created in step E30 (step E40), and compares the extracted layout information with the layout information of ruled-line, which is previously registered in the pre-registered data base 22 to obtain definition information for character recognition (step E50; layout analyzing step).

Based on the definition information obtained in step E50, the partial image creating section 12 calculates the coordinates on the image data (original image; color image or gray scale image) of the form to create a partial image for recognizing the characters (step E60; original image creating step). Then, with respect to the created partial image, character recognition processing is carried out by the background discriminating section 13, the ruled-line extracting section 14, the first character area discriminating section 15, the enlarged image creating section 16, the ruled-line removing section 17, the interference judgment section 18, the character image restoring section 19, the second character area discriminating section 20 and the character recognizing section 21 (refer to FIG. 17) (step E70).

As described above, according to the form recognition apparatus 1 as an embodiment of the present invention, an image data of a color form is obtained as a color image, and using the tone level (R, G and B), hue and luminance or the like as color component or color information, the background, ruled-lines and character images are extracted. Thereby, the ruled-lines, background, guide character or the like, which may be a interference factor of the character recognition, can be removed and character recognition image free of noise can be extracted resulting in, while expanding the kinds of forms, which are recognizable with OCR, an improved character recognition accuracy.

Further, based on the dispersion amount and the appearance frequency (hue histogram) of the hue in a partial image, the background discriminating section 13 can readily detect the background pixels at a high speed; and with respect to the vertical direction and the horizontal direction of the partial image, the ruled-line extracting section 14 (ruled-line location estimating section 23) calculates the frequency distribution of the pixels, which have color information different from that of the pixels constituting the background area. As a result, a location having a frequency larger than a predetermined value is recognized as a possible location of a ruled-line. Thereby, the location of the ruled-line can be readily recognized at a high speed.

Furthermore, based on the hue histogram in the possible location of the ruled-line, which is recognized by the ruled-line location estimating section 23, the ruled-line extracting section 14 (hue determination section 24) determines the hue of the ruled-line. Thereby, the hue of the ruled-line can be readily determined at a high speed.

Still furthermore, based on the continuity of the pixels, which have the same hue as the hue determined by the hue determination section 24, the ruled-line extracting section 14 (ruled-line information obtaining section 25) obtains the ruled-line information of the ruled-line. Thereby, the ruled-line (ruled-line information) can be readily and reliably determined.

In the first ruled-line removed image, which is created by the ruled-line removing section 17, the first character area discriminating section 15 can readily recognize the character area and the hue (luminance) thereof at a high speed.

Using the technique of forming sub-pixels, the enlarged image creating section 16 creates an enlarged image based on the partial image; and based on the enlarged image; the ruled-line removal and the character image are restored. Accordingly, even when the character image and the ruled-line interfere (overlap) with each other, a high accuracy character image can be extracted resulting in an increased recognition accuracy of the characters.

(B) Others

In the form recognition apparatus 1, the CPU (Central Processing Unit) in the information processing system (computer) executes the character recognition program (the medium processing program), thereby the CPU serves as the above-described layout analyzing section 11, the partial image creating section (the original image creating section) 12, the background discriminating section 13, the ruled-line extracting section (non-character line discriminating section) 14, the first character area discriminating section 15, the enlarged image creating section 16, the ruled-line removing section (the first non-character line removed image creating section, the second non-character line removed image creating section) 17, the interference judgment section 18, the character image restoring section 19, the second character area discriminating section 20, and the character recognizing section 21.

As for the program (the character recognition program and the medium processing program) for achieving the functions of the layout analyzing section 11, the partial image creating section (original image creating section) 12, the background discriminating section 13, the ruled-line extracting section (the non-character line discriminating section) 14, the first character area discriminating section 15, the enlarged image creating section 16, the ruled-line removing section (first non-character line removed image creating section, the second non-character line removed image creating section) 17, the interference judgment section 18, the character image restoring section 19, the second character area discriminating section 20 and the character recognizing section 21 is provided in a mode recoded in a computer readable recording medium such as, for example, a flexible disk, a CD-ROM, a CD-R, a CD-R/W, a DVD, a DVD-R, a DVD-R/W, a magnetic disk, an optical disk, a magnetic optical disk. The computer reads out the program from the recording medium and transfers the same to an internal memory or external memory and stores the same therein to use. Also the program may be recorded in, for example, a recording device (recording medium) such as a magnetic disk, an optical disk, a magnetic optical disk, and may be provided to the computer from the recording device via a communication path.

When realizing the functions as the layout analyzing section 11, the partial image creating section (the original image creating section) 12, the background discriminating section 13, the ruled-line extracting section (the non-character line discriminating section) 14, the first character area discriminating section 15, the enlarged image creating section 16, the ruled-line removing section (the first non-character line removed image creating section, the second non-character line removed image creating section) 17, the interference judgment section 18, the character image restoring section 19, the second character area discriminating section 20 and the character recognizing section 21, the program stored in an internal memory (in this embodiment, a RAM, a ROM, hard disk or the like in the computer) is executed by a microprocessor (in this embodiment, CPU 10) in the computer. Here, it may be arranged so that the program recorded in a recording medium is read out and executed by the computer.

In this embodiment, the wording "computer" is a concept, which includes hardware and an operating system, and means a hardware, which operates under the control of an operating system. Further, in the case where an application program makes the hardware operate independently without operating system, the hardware itself is equivalent to the computer. The hardware includes at least a microprocessor such as CPU and means for reading out the computer program recorded in the recording medium. In this embodiment, the form recognition apparatus 1 has the function as the computer.

Further, as for the recording medium in this embodiment, various computer-readable media such as, in addition to the above mentioned flexible disk, CD-ROM, CD-R, CD-R/W, DVD, DVD-R, DVD-R/W, magnetic disk, optical disk, magnetic optical disk, an IC card, a ROM cartridge, a magnetic tape, a punch card, an internal memory (memory such as RAM and ROM) of the computer and an external memory, and printed item printed with codes such as bar code are applicable.

Figure 19:
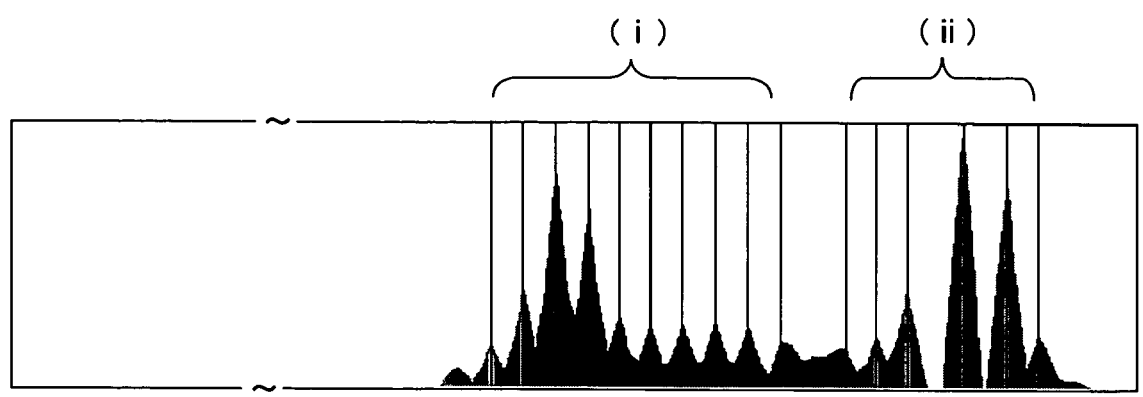
FIG. 19 is a diagram illustrating a hue cluster classifying technique in the form recognition apparatus in accordance with the embodiment of the present invention.

FIG. 19 is a diagram for illustrating the hue cluster classifying technique in the form recognition apparatus 1 as one embodiment of the present invention, which is a diagram showing an example of a hue histogram with respect to the partial image of the form shown in FIG. 2A.

By creating a hue histogram, which has the same hue component as that of the image shown in FIG. 2A, as shown in FIG. 19, a hue histogram (refer to reference symbol (i) in FIG. 19) of the blue pixels of input character (refer to FIG. 2B) and a hue histogram (refer to reference symbol (ii) in FIG. 19) of the red pixels of the pre-printed portion (refer to FIG. 2C) are created. The abscissa axis in FIG. 19 represents hue value; and the ordinate axis represents number of appearance times of the hue value.

In this form recognition apparatus 1, when processing the image data of the color form using the color image, the above-described hue cluster classification is made; thereby, judgment (hue separation, hue processing) of the background portion, the character portion and the pre-printed portion is made possible.

When an original such as a form printed using plural kinds of colors is read using a scanner, in the read out image, as shown in FIG. 19, due to unevenness or the like of the ink used for printing, a pixel data having slightly different hue values is created, and a plurality of peak values are detected adjacent to the peak value of the number of appearance times. Therefore, in this embodiment, the peak values of the same hue, which are included in a specific range of the hue value, are integrated into one. In this case, since the width (the abscissa axis of the histogram in FIG. 19) of the hue values differs depending on the hue, it may be arranged so that, by creating an integrating judgment table in which width as the reference for integrating of the peak values, and the peak values are integrated while referring to the integration judgment table.

Figure 20:
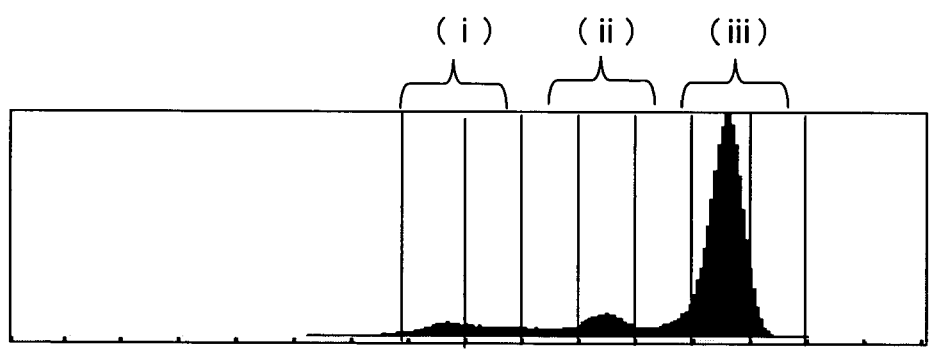
FIG. 20 is a diagram illustrating a luminance cluster classifying technique used in the form recognition apparatus in accordance with the embodiment of the present invention.

Also, FIG. 20 is a diagram for illustrating the luminance cluster classifying technique in one form recognition apparatus 1 as one embodiment of the present invention, and showing an example of the luminance histogram with respect to the partial image of the form shown in FIG. 2A. By creating a luminance histogram, which has the same luminance component as that of the image shown in FIG. 2A, as shown FIG. 20, the following histograms are created; i.e., a luminance histogram with respect to the luminance if the input character (refer to FIG. 2B) (refer to reference symbol (i) in FIG. 20), luminance histogram of the luminance of the pre-printed portion (refer to FIG. 2C) (refer to reference symbol (ii) in FIG. 20) and, a luminance histogram of the luminance of the background portion (refer to FIG. 2D) (refer to reference symbol (iii) in FIG. 20). The abscissa axis in FIG. 20 represents luminance value; and the ordinate axis represents the number of appearance times of the luminance value.

In this form recognition apparatus 1, when processing the image data of the color form using the gray scale image, the above-described luminance cluster classification is made; thereby judgment (gray processing) of the background portion, the character portion and the pre-printed portion is made possible.

A disclosure of the embodiments of the present invention makes it possible for person in the art to implement and manufacture the present invention.

INDUSTRIAL APPLICABILITY

The invention is applicable to the recognition of character information written on color manuscript, which is created using a plurality of colors.

The invention claimed is:

1. A character recognition apparatus, which extracts a character image from an original image including the character image and recognizes characters with respect to the character image, comprising:
  a background discriminating section that discriminates the background area based on the dispersion amount of color component and the frequency distribution with respect to color information in the original image,
  a non-character line discriminating section that discriminates non-character lines other than the characters and obtains non-character line information with respect to the non-character lines based on, in the original image, the frequency distribution of pixels having color information different from that of pixels constituting the background area and continuous pixels each having the same color characteristics and continuing more than a predetermined number,
  a first non-character line removed image creating section that creates a first non-character line removed image in which the non-character lines are removed from the original image by, in the original image, replacing the non-character lines, which are discriminated by the non-character line discriminating section, with pixels having the same color component as that of the background,
  a first character area discriminating section that discriminates, in the first non-character line removed image, which is created by the first non-character line removed image creating section, the area other than the background area including the continuous pixels each having the same color characteristics and continuing more than a predetermined number,
  an enlarged image creating section that creates an enlarged image based on the original image,
  a second non-character line removed image creating section that creates a second non-character line removed image in which non-character lines are removed from the enlarged image by, in the enlarged image, which is created by the enlarged image creating section, replacing the non-character lines with a background pixels, which have the same color component as that of the background, based on the non-character line information, which is obtained by the non-character line discriminating section,
  an interference judgment section that judges, in the original image, whether or not the characters and the non-character line interfere with each other based on the non-character line information, which is obtained by the non-character line discriminating section and the character area, which is discriminated by the first character area discriminating section,
  a character image restoring section that, when the interference judgment section judges that the character image and the non-character line interfere with each other, restores the character image with respect to the interference point between the character image and the non-character line in the second non-character line removed image based on the difference between the color information with respect to the character image and the color information with respect to the non-character line,
  a second character area discriminating section that discriminates the area larger than a predetermined size, which is, in the second non-character line removed image, the area other than the background area including the continuous pixels each having the same color characteristics and continuing more than a predetermined number, as the character area, and
  a character recognizing section that digitizes the character area, where is discriminated by the second character area discriminating section and recognizes the characters.

2. The character recognition apparatus according to claim 1, wherein
  the non-character line discriminating section comprises:
  a non-character line location estimating section that calculates, with respect to the vertical direction and the horizontal direction of the original image respectively, the frequency distribution of the pixels, which have color information different from that of the pixels constituting the background area, and based on a result thereof, discriminates the location, which has a frequency larger than a predetermined value, as non-character line possible location,
  a color information determination section that determines the color information with respect to the non-character line based on the frequency distribution with respect to the color information in the non-character line possible location, which is discriminated by the non-character line location estimating section, and a non-character line information obtaining section that obtains the non-character line information with respect to the non-character line based on the continuity of the pixels with respect to the same color information as the color information, which is determined by the color information determination section.

3. The character recognition apparatus according to claim 1, in which the character image restoring section forms, with respect to the interference point between said character image and the non-character line in the second non-character line removed image, the character outline in the character image with spline curve based on the difference between the color information with respect to the character image and the color information with respect to the non-character line, and fills the area enclosed by the character outline with pixels having the same color information as the color information with respect to said character image.

4. The character recognition apparatus according to claim 2, in which the character image restoring section forms, with respect to the interference point between said character image and the non-character line in the second non-character line removed image, the character outline in the character image with spline curve based on the difference between the color information with respect to the character image and the color information with respect to the non-character line, and fills the area enclosed by the character outline with pixels having the same color information as the color information with respect to said character image.

5. A character recognition method for extracting a character image from an original image including the character image and recognizing characters with respect to the character image, comprising:

a background discriminating step for discriminating the background area based on the dispersion amount of color component and the frequency distribution with respect to color information in the original image, a non-character line discriminating step for discriminating non-character lines other than the characters and obtaining non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating step for creating a first non-character line removed image in which the non-character lines are removed from the original image by, in the original image, replacing the non-character lines, which are discriminated in the non-character line discriminating step, with pixels having the same color component as that of the background, a first character area discriminating step for discriminating, in the first non-character line removed image, which is created in the first non-character line removed image creating step, the area other than the background area including the continuous pixels each having the same color characteristics and continuing more than a predetermined number, an enlarged image creating step for creating an enlarged image based on the original image, a second non-character line removed image creating step for creating a second non-character line removed image in which non-character lines are removed from the enlarged image by, in the enlarged image, which is created by the enlarged image creating step, replacing the non-character lines with a background pixels, which have the same color component as that of the background, based on the non-character line information, which is obtained in the non-character line discriminating step, an interference judgment step for judging, in the original image, whether or not the characters and the non-character line interfere with each other based on the non-character line information, which is obtained in the non-character line discriminating step and the character area, which is discriminated in the first character area discriminating step, a character image restoring step for, when it is judged in the interference judgment step that the character image and the non-character line interfere with each other, restoring the character image with respect to the interference point between the character image and the non-character line in the second non-character line removed image based on the difference between the color information with respect to the character image and the color information with respect to the non-character line, a second character area discriminating step for discriminating the area larger than a predetermined size, which is, in the second non-character line removed image, the area other than the background area including the continuous pixels each having the same color characteristics and continuing more than a predetermined number, as the character area, and a character recognizing step for digitizing the character area, where is discriminated in the second character area discriminating step and recognizing the characters.

6. The character recognition method according to claim 5, wherein the non-character line discriminating step comprises:

a non-character line location estimating step for calculating, with respect to the vertical direction and the horizontal direction of the original image respectively, the frequency distribution of the pixels, which have color information different from that of the pixels constituting the background area, and based on a result thereof, discriminating the location, which has a frequency larger than a predetermined value, as non-character line possible location, a color information determination step for determining the color information with respect to the non-character line based on the frequency distribution with respect to the color information in the non-character line possible location, which is discriminated in the non-character line location estimating step, and a non-character line information obtaining step for obtaining the non-character line information with respect to the non-character line based on the continuity of the pixels with respect to the same color information as the color information, which is determined in the color information determination step.

7. The character recognition method according to claim 5, in which the character image restoring step forms, with respect to the interference point between said character image and the non-character line in the second non-character line removed image, the character outline in the character image with spline curve based on the difference between the color information with respect to the character image and the color information with respect to the non-character line, and fills the area enclosed by the character outline with pixels having the same color information as the color information with respect to said character image.

8. The character recognition method according to claim 6, in which the character image restoring step forms, with respect to the interference point between said character image and the non-character line in the second non-character line removed image, the character outline in the character image with spline curve based on the difference between the color information with respect to the character image and the color information with respect to the non-character line, and fills the area enclosed by the character outline with pixels having the same color information as the color information with respect to said character image.

9. A computer readable medium storing therein a character recognition program for making a computer execute character recognition function to extract a character image from an original image including the character image and to recognize characters with respect to the character image, wherein said character recognition program instructs the computer to function as the following:

a background discriminating section that discriminates the background area based on the dispersion amount of color component and the frequency distribution with respect to color information in the original image, a non-character line discriminating section that discriminates non-character lines other than the characters and obtains non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating section that creates a first non-character line removed image in which the non-character lines are removed from the original image by, in the original image, replacing the non-character lines, which are discriminated by the non-character line discriminating section, with pixels having the same color component as that of the background, a first character area discriminating section that discriminates, in the first non-character line removed image, which is created by the first non-character line removed image creating section, the area other than the background area including the continuous pixels each having the same color characteristics and continuing more than a predetermined number, an enlarged image creating section that creates an enlarged image based on the original image, a second non-character line removed image creating section that creates a second non-character line removed image in which non-character lines are removed from the enlarged image by, in the enlarged image, which is created by the enlarged image creating section, replacing the non-character lines with a background pixels, which have the same color component as that of the background, based on the non-character line information, which is obtained by the non-character line discriminating section, an interference judgment section that judges, in the original image, whether or not the characters and the non-character line interfere with each other based on the non-character line information, which is obtained by the non-character line discriminating section and the character area, which is discriminated by the first character area discriminating section, a character image restoring section that, when the interference judgment section judges that the character image and the non-character line interfere with each other, restores the character image with respect to the interference point between the character image and the non-character line in the second non-character line removed image based on the difference between the color information with respect to the character image and the color information with respect to the non-character line, a second character area discriminating section that discriminates the area larger than a predetermined size, which is, in the second non-character line removed image, the area other than the background area including the continuous pixels each having the same color characteristics and continuing more than a predetermined number, as the character area, and a character recognizing section that digitizes the character area, where is discriminated by the second character area discriminating section and recognizes the characters.

10. A computer readable medium storing therein a character recognition program according to claim 9, wherein, when the character recognition program makes the computer function the non-character line discriminating section, said character recognition program instructs the computer to function also as the following:

a non-character line location estimating section that calculates, with respect to the vertical direction and the horizontal direction of the original image respectively, the frequency distribution of the pixels, which have color information different from that of the pixels constituting the background area, and based on a result thereof, discriminates the location, which has a frequency larger than a predetermined value, as non-character line possible location, a color information determination section that determines the color information with respect to the non-character line based on the frequency distribution with respect to the color information in the non-character line possible location, which is discriminated by the non-character line location estimating section, and a non-character line information obtaining section that obtains the non-character line information with respect to the non-character line based on the continuity of the pixels with respect to the same color information as the color information, which is determined by the color information determination section.

11. A medium processing apparatus, which recognizes characters based on a medium image read from a medium recording therein characters, comprising:

a layout analyzing section that, based on the medium image, extracts the characteristics of layout of the medium image and analyzes the constitution of the layout, an original image creating section that, based on the result of the analysis by the layout analyzing section, creates an original image including a character image, which is subjected to the character recognition, a background discriminating section that discriminates the background area based on the dispersion amount of color component and the frequency distribution with respect to color information in the original image, a non-character line discriminating section that discriminates non-character lines other than the characters and obtains non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating section that creates a first non-character line removed image in which the non-character lines are removed from the original image by, in the original image, replacing the non-character lines, which are discriminated by the non-character line discriminating section, with pixels having the same color component as that of the background, a first character area discriminating section that discriminates, in the first non-character line removed image, which is created by the first non-character line removed image creating section, the area other than the background area including the continuous pixels each having the same color characteristics and continuing more than a predetermined number, an enlarged image creating section that creates an enlarged image based on the original image, a second non-character line removed image creating section that creates a second non-character line removed image in which non-character lines are removed from the enlarged image by, in the enlarged image, which is created by the enlarged image creating section, replacing the non-character lines with a background pixels, which have the same color component as that of the background, based on the non-character line information, which is obtained by the non-character line discriminating section, an interference judgment section that judges, in the original image, whether or not the characters and the non-character line interfere with each other based on the non-character line information, which is obtained by the non-character line discriminating section and the character area, which is discriminated by the first character area discriminating section, a character recognizing section that digitizes the character area, where is discriminated by the second character area discriminating section and recognizes the characters.

12. The medium processing apparatus according to claim 11, wherein the non-character line discriminating section comprises:

a non-character line location estimating section that calculates, with respect to the vertical direction and the horizontal direction of the original image respectively, the frequency distribution of the pixels, which have color information different from that of the pixels constituting the background area, and based on a result thereof, discriminates the location, which has a frequency larger than a predetermined value, as non-character line possible location, a color information determination section that determines the color information with respect to the non-character line based on the frequency distribution with respect to the color information in the non-character line possible location, which is discriminated by the non-character line location estimating section, and a non-character line information obtaining section that obtains the non-character line information with respect to the non-character line based on the continuity of the pixels with respect to the same color information as the color information, which is determined by the color information determination section.

13. A medium processing method for recognizing characters based on a medium image read out from a medium recording therein the characters, comprising:

a layout analyzing step for, based on medium image, extracting characteristics of layout of the medium image and analyzing the constitution of the layout, an original image creating step for, based on the analysis result in the layout analyzing step, creating an original image including a character image, which is subjected to the character recognition, a background discriminating step for discriminates the background area based on the dispersion amount of color component and the frequency distribution with respect to color information in the original image, a non-character line discriminating step for discriminating non-character lines other than the characters and obtaining non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating step for creating a first non-character line removed image in which the non-character lines are removed from the original image by, in the original image, replacing the non-character lines, which are discriminated in the non-character line discriminating step, with pixels having the same color component as that of the background, a first character area discriminating step for discriminating, in the first non-character line removed image, which is created in the first non-character line removed image creating step, the area other than the background area including the continuous pixels each having the same color characteristics and continuing more than a predetermined number, an enlarged image creating step for creating an enlarged image based on the original image, a second non-character line removed image creating step for creating a second non-character line removed image in which non-character lines are removed from the enlarged image by, in the enlarged image, which is created by the enlarged image creating step, replacing the non-character lines with a background pixels, which have the same color component as that of the background, based on the non-character line information, which is obtained in the non-character line discriminating step, an interference judgment step for judging, in the original image, whether or not the characters and the non-character line interfere with each other based on the non-character line information, which is obtained in the non-character line discriminating step and the character area, which is discriminated in the first character area discriminating step, a character image restoring step for, when it is judged in the interference judgment step that the character image and the non-character line interfere with each other, restoring the character image with respect to the interference point between the character image and the non-character line in the second non-character line removed image based on the difference between the color information with respect to the character image and the color information with respect to the non-character line, and a second character area discriminating step for discriminating the area larger than a predetermined size, which is, in the second non-character line removed image, the area other than the background area including the continuous pixels each having the same color characteristics and continuing more than a predetermined number, as the character area, a character recognizing step for digitizing the character area, where is discriminated in the second character area discriminating step and recognizing the characters.

14. The medium processing method according to claim 13, wherein the non-character line location discriminating step comprises:

a non-character line location estimating step for calculating, with respect to the vertical direction and the horizontal direction of the original image respectively, the frequency distribution of the pixels, which have color information different from that of the pixels constituting the background area, and based on a result thereof, discriminating the location, which has a frequency larger than a predetermined value, as non-character line possible location, a color information determination step for determining the color information with respect to the non-character line based on the frequency distribution with respect to the color information in the non-character line possible location, which is discriminated in the non-character line location estimating step, and a non-character line information obtaining step for obtaining the non-character line information with respect to the non-character line based on the continuity of the pixels with respect to the same color information as the color information, which is determined in the color information determination step.

15. A computer readable medium storing therein a medium processing computer readable program for, based on a medium image, which is read from a medium recording therein characters, making a computer execute a medium processing function to recognize the characters, wherein said medium processing program instructs the computer to function as the following: a layout analyzing section that, based on the medium image, extracts the characteristics of layout of the medium image and analyzes the constitution of the layout, an original image creating section that, based on the result of the analysis by the layout analyzing section, creates an original image including a character image, which is subjected to the character recognition, a background discriminating section that discriminates the background area based on the dispersion amount of color component and the frequency distribution with respect to color information in the original image, a non-character line discriminating section that discriminates non-character lines other than the characters and obtains non-character line information with respect to the non-character lines based on, in the original image, the frequency distribution of pixels having color information different from that of pixels constituting the background area and continuous pixels each having the same color characteristics and continuing more than a predetermined number, a first non-character line removed image creating section that creates a first non-character line removed image in which the non-character lines are removed from the original image by, in the original image, replacing the non-character lines, which are discriminated by the non-character line discriminating section, with pixels having the same color component as that of the background, a first character area discriminating section that discriminates, in the first non-character line removed image, which is created by the first non-character line removed image creating section, the area other than the background area including the continuous pixels each having the same color characteristics and continuing more than a predetermined number, an enlarged image creating section that creates an enlarged image based on the original image, a second non-character line removed image creating section that creates a second non-character line removed image in which non-character lines are removed from the enlarged image by, in the enlarged image, which is created by the enlarged image creating section, replacing the non-character lines with a background pixels, which have the same color component as that of the background, based on the non-character line information, which is obtained by the non-character line discriminating section, an interference judgment section that judges, in the original image, whether or not the characters and the non-character line interfere with each other based on the non-character line information, which is obtained by the non-character line discriminating section and the character area, which is discriminated by the first character area discriminating section, a character image restoring section that, when the interference judgment section judges that the character image and the non-character line interfere with each other, restores the character image with respect to the interference point between the character image and the non-character line in the second non-character line removed image based on the difference between the color information with respect to the character image and the color information with respect to the non-character line, a second character area discriminating section that discriminates the area larger than a predetermined size, which is, in the second non-character line removed image, the area other than the background area including the continuous pixels each having the same color characteristics and continuing more than a predetermined number, as the character area, and a character recognizing section that digitizes the character area, where is discriminated by the second character area discriminating section and recognizes the characters.

16. A computer readable medium storing therein a medium processing computer readable program according to claim 15, wherein, when the medium processing computer readable program makes the computer function the non-character line discriminating section, said medium processing program instructs the computer to function also as the following:

a non-character line location estimating section that calculates, with respect to the vertical direction and the horizontal direction of the original image respectively, the frequency distribution of the pixels, which have color information different from that of the pixels constituting the background area, and based on a result thereof, discriminates the location, which has a frequency larger than a predetermined value, as non-character line possible location, a color information determination section that determines the color information with respect to the non-character line based on the frequency distribution with respect to the color information in the non-character line possible location, which is discriminated by the non-character line location estimating section, and a non-character line information obtaining section that obtains the non-character line information with respect to the non-character line based on the continuity of the pixels with respect to the same color information as the color information, which is determined by the color information determination section.

17. A computer readable medium storing therein a medium processing computer readable program according to claim 15, wherein, when the medium processing computer readable program makes the computer function the character image restoring section as the character image restoring section, which forms, with respect to the interference point between said character image and the non-character line in the second non-character line removed image, the character outline in the character image with spline curve based on the difference between the color information with respect to the character image and the color information with respect to the non-character line, and fills the area enclosed by the character outline with pixels having the same color information as the color information with respect to said character image.

18. A computer readable medium storing therein a medium processing computer readable program according to claim 16, wherein, when the medium processing computer readable program makes the computer function the character image restoring section as the character image restoring section, which forms, with respect to the interference point between said character image and the non-character line in the second non-character line removed image, the character outline in the character image with spline curve based on the difference between the color information with respect to the character image and the color information with respect to the non-character line, and fills the area enclosed by the character outline with pixels having the same color information as the color information with respect to said character image.

* * * * *